United States Patent [19]

Inoue et al.

[11] Patent Number: 5,758,200

[45] Date of Patent: May 26, 1998

[54] WATER PROOF CAMERA, WATER PROOF APPARATUS AND ITS ASSEMBLING METHOD

[75] Inventors: Yoshiyuki Inoue, Izumi; Akihiro Oki, Sakai; Akihiro Baba, Izumi, all of Japan

[73] Assignee: Minolta Co., Ltd., Osaka, Japan

[21] Appl. No.: 789,810

[22] Filed: Jan. 28, 1997

[30] Foreign Application Priority Data

Jan. 29, 1996 [JP] Japan .................... 8-012593

[51] Int. Cl.$^6$ .................................................. G03B 17/08
[52] U.S. Cl. ............................................................ 396/25
[58] Field of Search ................................ 396/25, 27, 28, 396/29; 348/81; 359/507, 513

[56] References Cited

U.S. PATENT DOCUMENTS

| | | | |
|---|---|---|---|
| 4,383,743 | 5/1983 | Nozawa et al. | 396/25 |
| 4,803,504 | 2/1989 | Maeno et al. | 396/25 |
| 5,305,032 | 4/1994 | Arai | 396/25 |

*Primary Examiner*—A. A. Mathews
*Attorney, Agent, or Firm*—McDermott, Will & Emery

[57] ABSTRACT

A camera, which is waterproof, having a relatively complicated three-dimensional configuration in which a cover thereof is constituted by a plurality of cover elements. A top cover 20, a front cover 30 and a side cover 40 are connected at the inside to form a first cover group. Then a main body 50 of the camera is connected to the first cover group to form a half completed body. A second cover group which is constituted by connecting a rear cover 60 to a bottom cover 70, and a lid 80, are connected to the half completed body. Each connection part therebetween has a rib and a groove corresponding to the rib. A packing is inserted into the groove to seal the groove and rib. Thus, a cover structure with a relatively complicated three-dimensional configuration as having a projecting grip, a pop-up flash, or the like, is possible to be made. At time of repair, for example, it is possible to get an access to the inner mechanisms of the camera, only by removing the second cover group from the camera body.

10 Claims, 20 Drawing Sheets

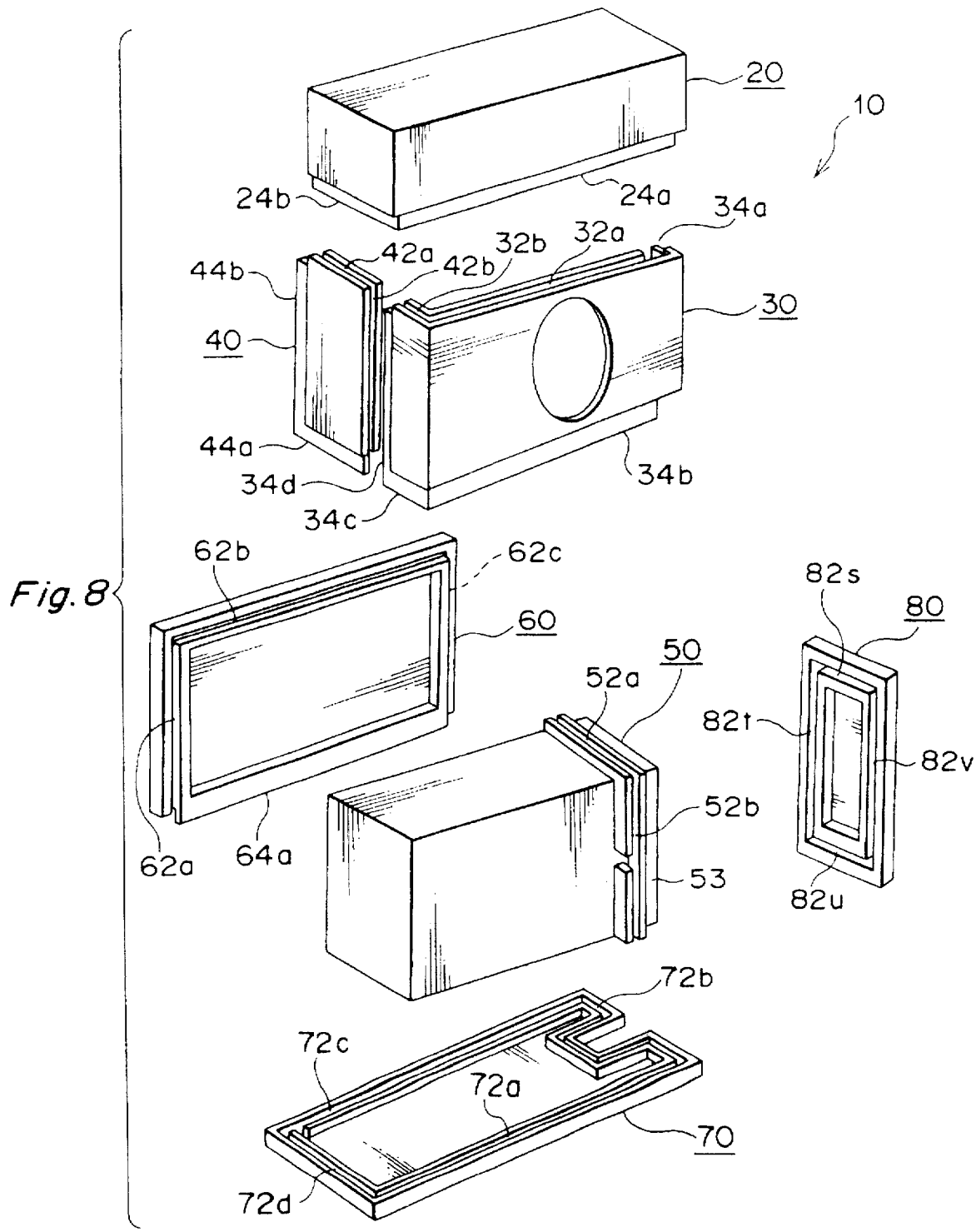

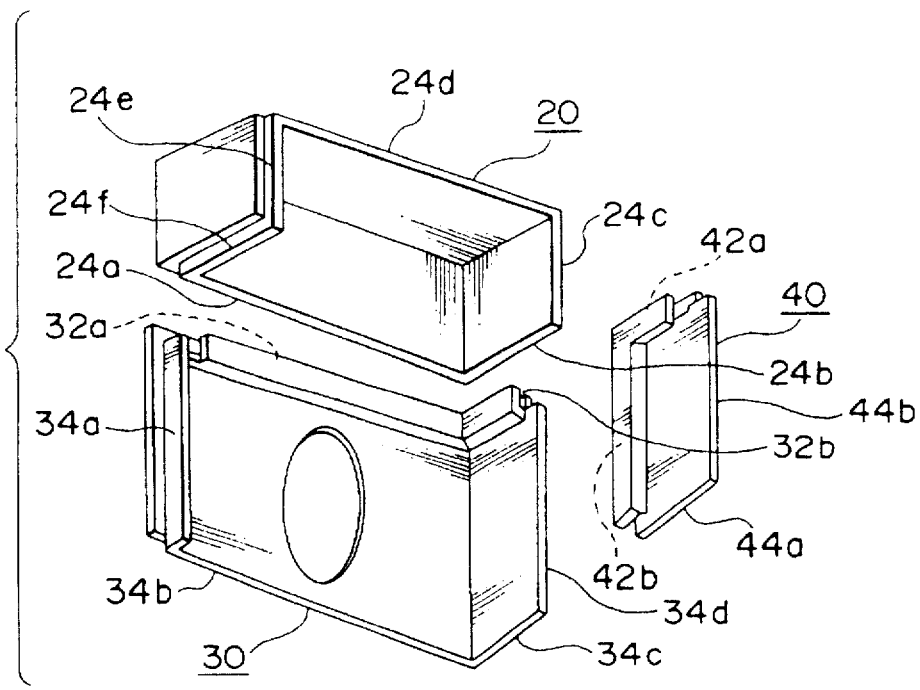
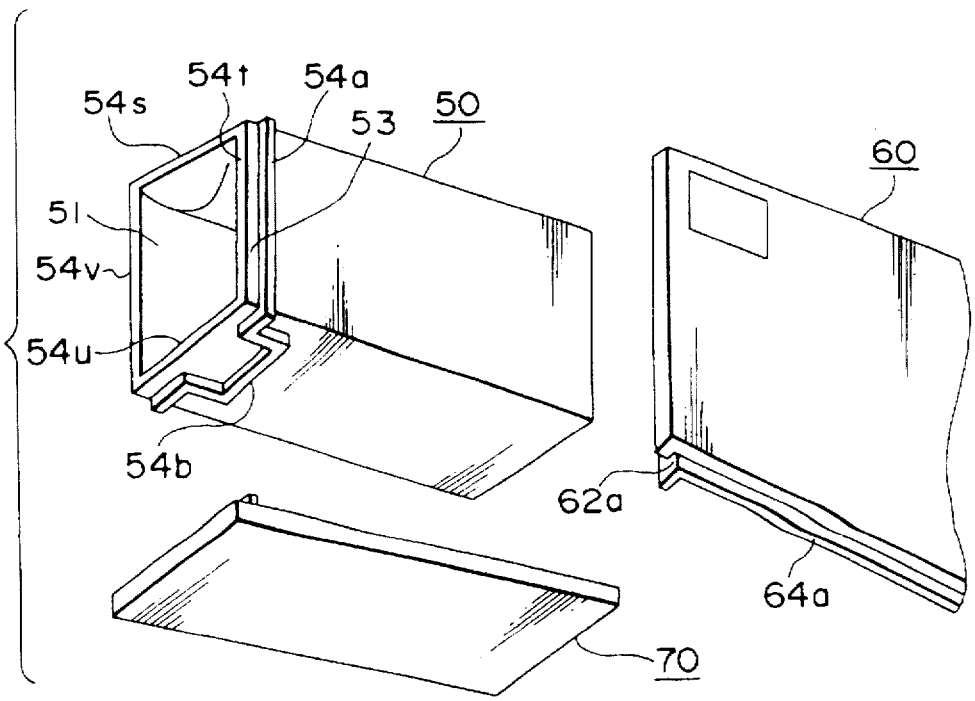

WATER PROOF CAMERA, WATER PROOF APPARATUS AND ITS ASSEMBLING METHOD

BACKGROUND OF THE INVENTION

1. Field of the Invention

The present invention relates to a water-proof camera, a water-proof apparatus and its assembling method, and more particularly relates to the water-proof camera and apparatus with a cover which is constituted by a plurality of cover elements and to the method for assembling the water-proof apparatus with a cover which is constituted by a plurality of cover elements.

2. Description of the Related Arts

As shown in a perspective view of FIG. 1 and a sectional view of FIG. 2, a conventional water-proof camera have covers 2 and 3 which are divided backward and forward into two parts on one surface which runs at right angle with respect to a direction of an optical axis, and the divided surface thereof is sealed. In the water-proof camera, each of the covers 2 and 3 has a water-proof structure which prevents the permeation of a liquid. Then, a projection 3a is formed on the divided surface of one cover while a groove 2a is formed on the divided surface of the other cover. After a packing 4 is inserted into the groove 2a, the two covers 2 and 3 are connected to each other, and the packing 4 which is compressed between the projection 3a and the groove 2a is filled therein so that the divided surfaces are sealed to each other thereby preventing an infiltration of water into the inside of the camera. Furthermore, as shown in FIG. 3, there is also provided a water-proof camera which is constituted so that one of the covers 3 is further divided into two covers 3x and 3y, and so that an O ring 4b is provided on the divided surface.

Because it is necessary to remove the covers 2, 3, 3x and 3y of such water-proof cameras from a metal mold at time of processing, the camera cannot be formed into a complicated three-dimensional shape. Consequently, in the conventional water-proof camera the covers of which are divided into two or three parts, it is inevitable that the covers have a generally box-like and relatively simple three-dimensional shape.

Consequently, in order to manufacture a waterproof camera having a more complicated three-dimensional shape, it is thought that the cover is divided into more parts which are to be assembled. In such a case, a problem arises of how the cover is divided. In other words, it is preferable that screws or the like for connecting the covers are not exposed to the front surface of the camera. In addition, it is important that the cover is formed into a three-dimensional shape with an excellent grip characteristics particularly for a single-lens reflex cameras. Furthermore, it is necessary to consider the operability, strength, ease of parts processing, and assemblage of parts and decomposition. Consequently, how the cover is divided must be determined under a comprehensive investigation. The determination thereof is not so easy.

Furthermore, it is necessary to seal the connecting surface of individual covers, in the water-proof camera. In water-proof products other than cameras, it is known that an integrally formed packing member 4x shown in a perspective view of FIG. 4 is used to seal a T-shaped connection surface. However, in case that such a special packing member 4x is individually used, the manufacturing cost thereof becomes high.

In a new photography system which has been proposed in recent years, the camera incorporates a film container automatic loading device in which the film is not required to be pulled out when the film is loaded in the camera. Furthermore, the size of the film container itself in this system is small. Consequently, the whole rear cover is not required to be opened and closed in this new camera system, unlike the 35 mm film camera. The camera in this system is constituted so that a lid of the film container chamber provided on a side of the camera is opened and closed to allow the film container to be put in and out of it. In such a structure, the open and close part which should be water-proof is small, and the water-proof camera can be easily constituted.

However, in the camera of this system, the film container is pressed by the lid of the film container chamber so that the film container is positioned in the film container automatic loading device, namely the film container chamber. Consequently, in case that the lid of the film container chamber is provided on the cover, the lid of the film container chamber changes in position with respect to the film container chamber under the influence of an error in the cover attachment and a deformation of the cover. As a result, the film container can not be positioned precisely in the film container chamber.

SUMMARY OF THE INVENTION

Consequently, one object of the present invention is to provide a water-proof camera which has a relatively complicated three-dimensional shape with a cover being most suitably divided into a plurality of cover elements or cover parts and which allows a film container to be precisely positioned relative to the film container chamber, the water-proof camera being not of a type in which the lid of the film container chamber is connected to the cover part, but of a type in which the cover part is hermetically connected to an opening part of the film container chamber.

Another object of the present invention is to provide a water-proof camera in which the connecting parts of the cover elements, and the connecting parts between the cover elements and the opening part of the film container chamber, are hermetically connected to each other without using a special packing member, in addition to realizing the above one object.

Still another object of the present invention is to provide a water-proof apparatus constituted by a plurality of cover elements in which the connecting parts of the cover elements are hermetically connected to each other with a simple sealing mechanism.

Still another object of the present invention is to provide a method for hermetically connecting cover elements to each other to form a cover, as a water-proof apparatus, with a simple sealing mechanism.

In accomplishing these and other objects of the present invention, there is provided a water-proof camera comprising: a camera body which has an opening part of a chamber for receiving a film container being loaded therein; a first cover member which covers a first part of the camera body and which is hermetically connected to the opening part by a sealing mechanism; a second cover member which covers a second part of the camera body, wherein the first and second covers are hermetically connected to each other by the sealing mechanism; and a chamber lid, able to be opened and closed relative to the opening part, which is hermetically connected to the opening part by the sealing mechanism when the chamber lid is closed relative to the opening part.

In the construction, the chamber lid may be rotatably mounted relative to the opening part of the camera body.

In the construction, the first and second cover members may be divided optionally. For example, the first cover member may form a front surface, a top surface, and one side surface of the camera, while the second cover member may form a bottom surface and a rear surface thereof. In this construction, the chamber lid may form the other side of the camera.

Each of the cover members and the chamber lid is not only used to form each surface of the camera, but also used to form a surface adjacent to it by cutting into the adjacent surface. In the case, the adjacent cover member and/or chamber lid are/is so constructed that the part thus cut into has a correspondingly complementary cut. For example, the first cover member may form a top surface and bend to form a part of the front surface with a part of the first cover member being cut into a part of the front surface. Similarly, the second cover member may form a front surface and bend to form a part of one side surface with a part of the second cover member being cut into a part of the one side surface.

In the above construction, the parts of the camera exposed outside are the first and second cover members, the chamber lid, and the opening part of the chamber for receiving the film container. Because the first and second cover members are connected to each other hermetically, because the opening part of the camera body is connected to the first cover member hermetically, and because the chamber lid is connected to the opening part of the camera body hermetically, inflow or permeation of liquid from outside through the connecting parts therebetween is surely prevented. In the construction, the first and second cover members, the camera body itself therefore the opening part thereof, and the chamber lid, are all formed water-proof. That is, there is provided a water-proof camera which is not of a type in which the lid of the film container chamber is connected to the cover part, but of a type in which the cover part is hermetically connected to the opening part of the film container chamber.

In the above construction, it is possible to construct the water-proof camera so that a part of a screw for connecting the camera body to either the first or second cover member as a front surface does not project outside the front surface by connecting the camera body to an inner surface of the front surface from inside of the camera with the screw so as not to penetrate the front surface.

According to the construction, in case that the water-proof camera is of a type with a complicated configure and design as of a type in which a gripping part thereof projects in three dimensions, of a type in which there is provided a release button and/or a pop-up electric flash, it is possible to divide the cover into the first and second cover members so that each of the cover members can be taken out from the metal mold.

According to the above construction, in case that the water-proof camera is loaded with a film container, the chamber lid is opened, the film container is put in the film container chamber, and the film chamber lid is closed. At this time, the film container is pressed by the chamber lid and is positioned with respect to the film chamber. Because the chamber lid is directly mounted on the opening part of the camera body, the chamber lid is not affected by a mounting error or deformation of the cover. Consequently, a precision for positioning the chamber lid with respect to the film container chamber is greater than the corresponding precision of a type in which the film chamber lid is directly mounted on the cover. In other words, a precision for positioning the film container with respect to the film container chamber is greater.

In other words, according to the above construction, there is provided a water-proof camera which has a relatively complicated three-dimensional shape with a cover being optionally suitably divided into a plurality of cover elements or cover parts and which allows a film container to be precisely positioned relative to the film container chamber.

Preferably, the sealing mechanism may comprise a rim, a groove which engages the rim, and a packing member which is put between the rim and the groove. In the construction, the rim may be formed on the first cover member, and the groove may be formed on the second cover member, for example. Alternatively, the rim may be formed on the second cover member, and the groove may be formed on the first cover member. Alternatively, the rim and the groove may be formed on the first cover member, and the groove and the rim may be formed on the second cover member. In each case, the first and second cover members are constructed so that they hermetically engage with each other with the packing member being put therebetween.

Preferably, the packing member may be in a form of a string.

With the construction, the connecting parts of the cover elements, and the connecting parts between the cover element and the opening part of the film container chamber, are hermetically connected to each other without using a special packing member.

Alternatively, the packing member may be an optional material such as a sealing material which is made to flow in the groove.

In the construction, it is preferable that the sealing mechanism forms on a periphery of the first cover member and on a periphery of the second cover member, wherein the packing member engages and is supported by the groove.

With the construction, the assembling process of the water-proof camera is effectively simplified by putting the packing member in the groove beforehand. That is, in case that the packing member does not engage and is not supported by the groove, the first and second cover members must be connected to each other with the packing member being intentionally supported between the first and second cover members; otherwise, the packing member would fall from between the two cover members. However, if the packing member engages and is supported by the groove beforehand in the assembling process, there is no need of intentionally keeping the packing member between the first and second cover members at time of connecting the first and second cover members, thus simplifying the assembling process.

With the construction, the water-proof camera is assembled as follows, for example.

First, the first cover member is fixed to the camera body, by fixing means such as a screw as mentioned above, with a counterpart of the sealing mechanism of the first cover member being matched with a counterpart of the sealing mechanism of the opening part of the camera body, thus forming a first cover group.

Next, the second cover member is fixed to the first cover member and to the camera body of the first cover group, by the fixing means, so that a counterpart of the sealing mechanism of the second cover member is matched with a counterpart of the sealing mechanism of the first cover member and so that a counterpart of the sealing mechanism of the second cover member is matched with a counterpart of the sealing mechanism of the camera body, thus forming a second cover group.

Next, the chamber lid is fixed to the opening part of the camera body of the second cover group, with a counterpart of the sealing mechanism of the chamber lid being matched with a counterpart of the opening part of the camera body, thus perfecting the water-proof camera.

When the assembling of the water-proof camera is thus accomplished, the packing member is compressed between the rim and the groove. Therefore, the space between the rim and the groove is filled with the packing member, thus the first and second cover members being connected to each other hermetically.

In accomplishing the above objects of the present invention, there is also provided a water-proof apparatus comprising: a body; a first cover which covers a first part of the body; a second cover which covers a second part of the body and which is hermetically connected to the first cover; a third cover which covers a third part of the body and which is hermetically connected to the first and second covers; and at least one packing member in a form of a string which is provided among the first, second and third covers to hermetically connect one another.

According to this construction, the connecting parts of the first, second and third covers are hermetically connected to each other with a simple sealing mechanism which is constituted by a string-form member as a packing member.

Similarly, it is possible to construct the waterproof apparatus of covers more than four covers, and to connect the covers to each other with the packing member therebetween in the same manner as aforementioned.

In the construction, at least a pair of ends of the packing member, namely, at least two ends thereof, may be arranged in a vicinity of a part where the first, second and third covers oppose one another.

In this construction, it is preferable that the ends of the packing member are overlapped with each other.

With the construction, any space possibly made with all the covers facing or opposing each other is filled by the ends of the packing member so that the connecting part in which all the covers face or oppose each other is effectively sealed with them.

In accomplishing the above objects of the present invention, there is also provided a method for assembling a water-proof apparatus, comprising the steps of: connecting a first cover member with a first edge and a second edge to form a periphery of the first cover member and a second cover member with a first edge and a second edge to form a periphery of the second cover member to each other, with a first part of a string-like packing including a pair of ends thereof being pinched between the first edge of the first cover member and the first edge of the second cover member; providing a second part of the string-like packing along the second edge of the first cover member and the second edge of the second cover member; providing the second part of the string-like packing between the second edge of the first cover member and a first edge of a third cover member with the first edge and a second edge to form a periphery of the third cover member, and between the second edge of the second cover member and the second edge of the third cover member; and connecting the first, second and third cover members to each other, with the second part of the string-like packing being pinched between the second edge of the first cover member and the first edge of the third cover member and between the second edge of the second cover member and the second edge of the third cover member, wherein the first, second and third covers are hermetically connected to each other.

According to the method, the connecting parts of the first, second and third covers are hermetically connected to each other with a simple sealing mechanism which is constituted by the string-like packing, thus realizing a cost down of the production.

In the method, it may further comprise the step of arranging at least the pair of ends of the string-like packing in a vicinity of a part where the first, second and third cover members oppose one another.

In this case, it is preferable to further comprise the step of overlapping the ends of the string-like packing with each other.

With the additional step, any space possibly made with all the covers facing or opposing each other is filled by the ends of the packing member so that the connecting part in which all the covers face or oppose each other is effectively sealed with them.

BRIEF DESCRIPTION OF THE DRAWINGS

These and other objects and features of the present invention will become clear from the following description taken in conjunction with the preferred embodiments thereof with reference to the accompanying drawings, in which:

FIG. 8 is an exploded perspective view of the water-proof camera according to a first embodiment of the present invention;

FIG. 9 is a perspective view of an essential part of the water-proof camera of FIG. 8 as seen from an opposite side thereto;

FIG. 10 is a perspective view of an essential part of the water-proof camera of FIG. 8 as seen from an opposite side thereto;

DETAILED DESCRIPTION OF THE INVENTION

Figure 1:
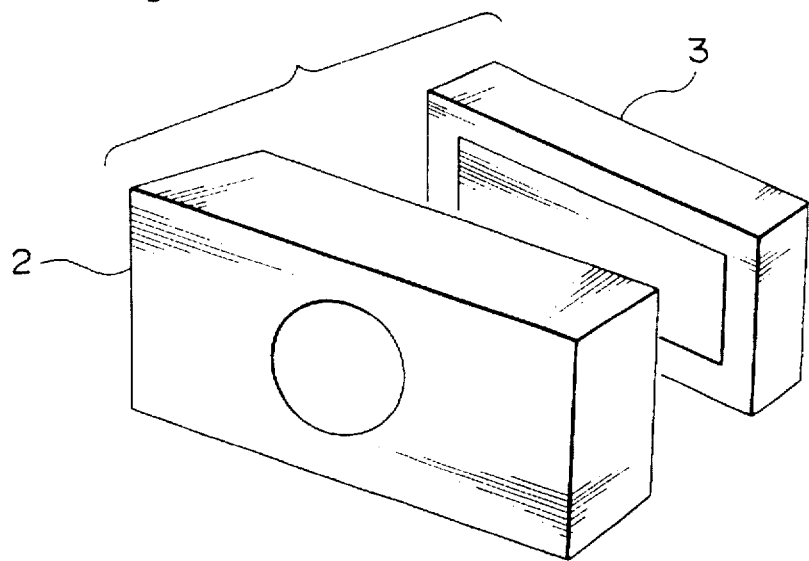
FIG. 1 is a schematic perspective view of a cover of a conventional water-proof camera.
Figure 2:
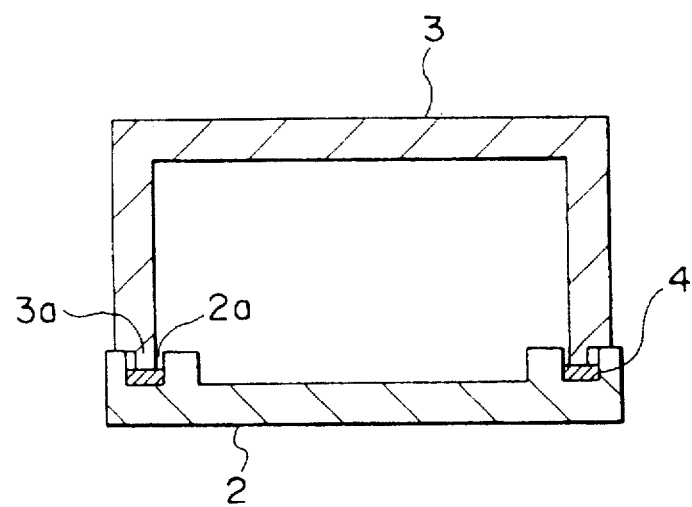
FIG. 2 is a sectional view of FIG. 1.
Figure 3:
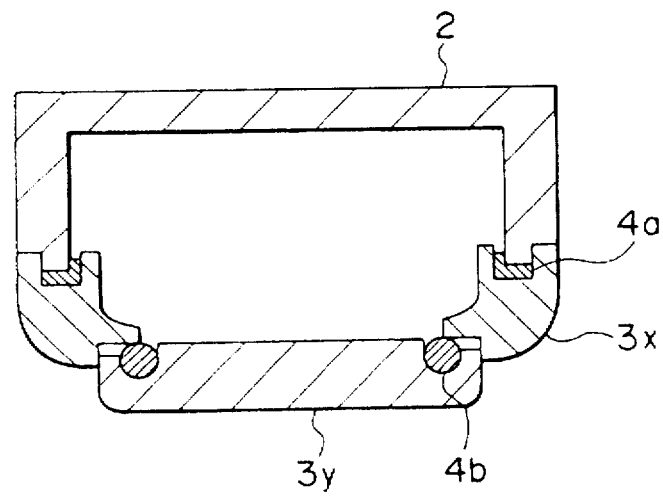
FIG. 3 is a sectional view of another conventional water-proof camera.
Figure 4:
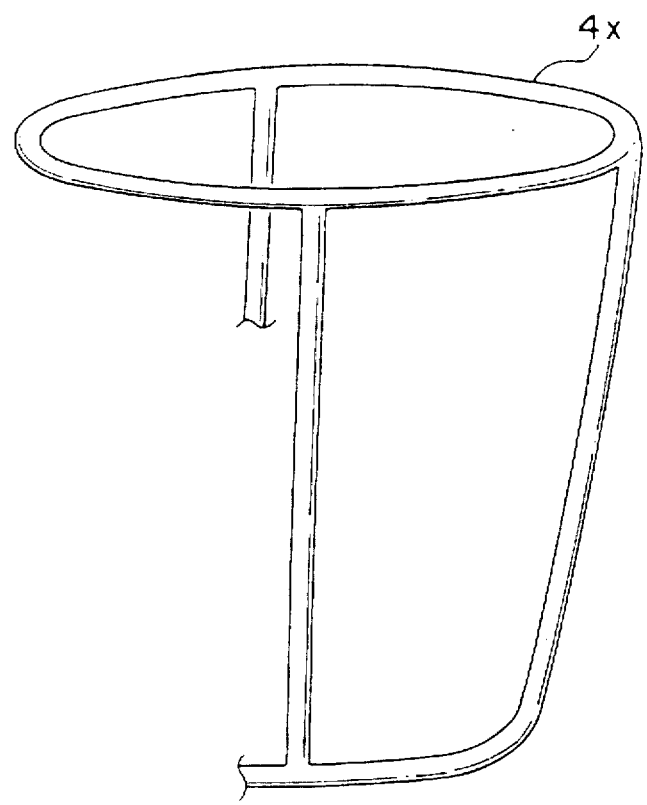
FIG. 4 is a perspective view of a conventional packing member.

Before the description of the present invention proceeds, it is to be noted that like parts are designated by like reference numerals through the accompanying drawings.

Referring to FIGS. 5 to 37, full description is made on a water-proof camera.

First, the water-proof camera according to a first embodiment of the present invention is explained with reference to FIGS. 5 to 33.

The water-proof camera 10 is a single-lens reflex camera. As shown in FIG. 8 which is a schematic perspective view seen from the top of the front surface, and in FIGS. 9 and 10 which are schematic perspective views seen from the bottom of the rear surface, this water-proof camera 10 generally comprises a main body 50 of the camera, a top cover 20, a front cover 30, a side cover 40, a rear cover 60 and a bottom cover 70 which cover a periphery of the main body 50 of the camera. The camera 10 also comprises a container chamber lid 80. In the water-proof camera 10, as shown in six surface views of FIGS. 11 to FIG. 16, the periphery of the main body (not shown) of the camera is hermetically covered with each of the covers 20, 30, 30, 40, 60, and 70, and a lid 80 for external attachment thereby preventing a liquid from infiltrating into the inside of the camera.

Figure 5A:
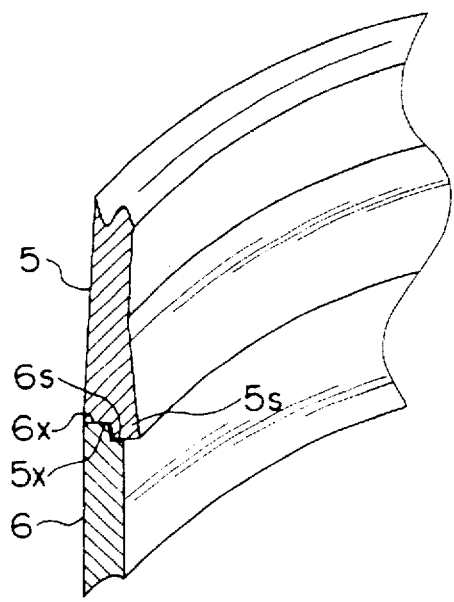
FIG. 5A is a partially sectional perspective view of a connection part of a cover of a conventional camera.
Figure 5B:
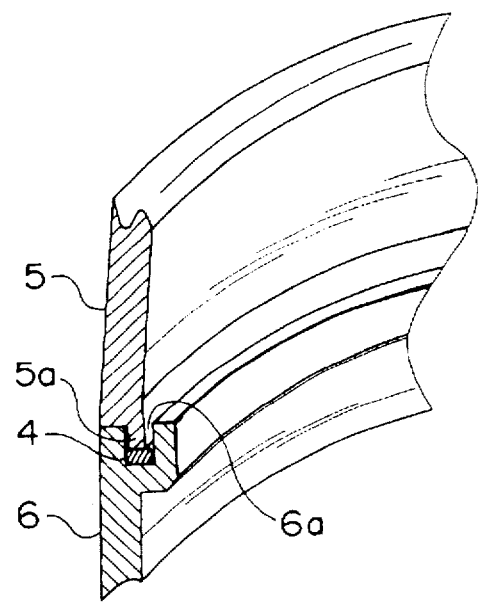
FIG. 5B is a view similar to FIG. 5A of a waterproof camera.
Figure 6:
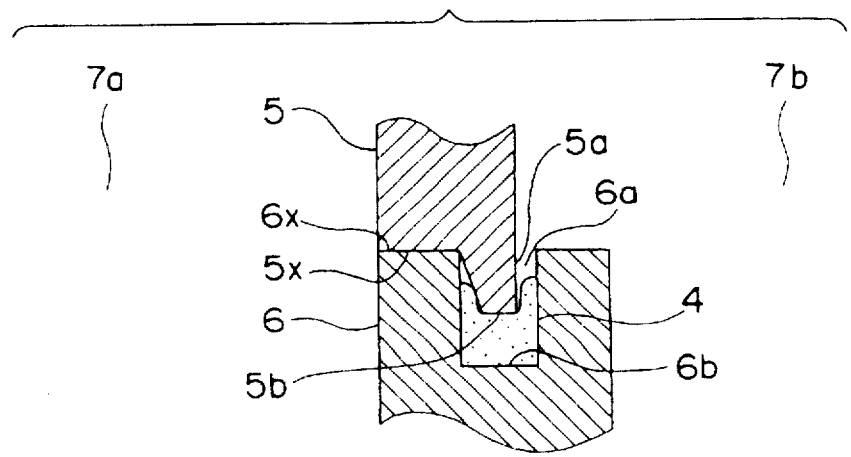
FIG. 6 is an enlarged sectional view of an essential part of a cover connection part, according to an embodiment of the present invention, of a water-proof camera.
Figure 7:
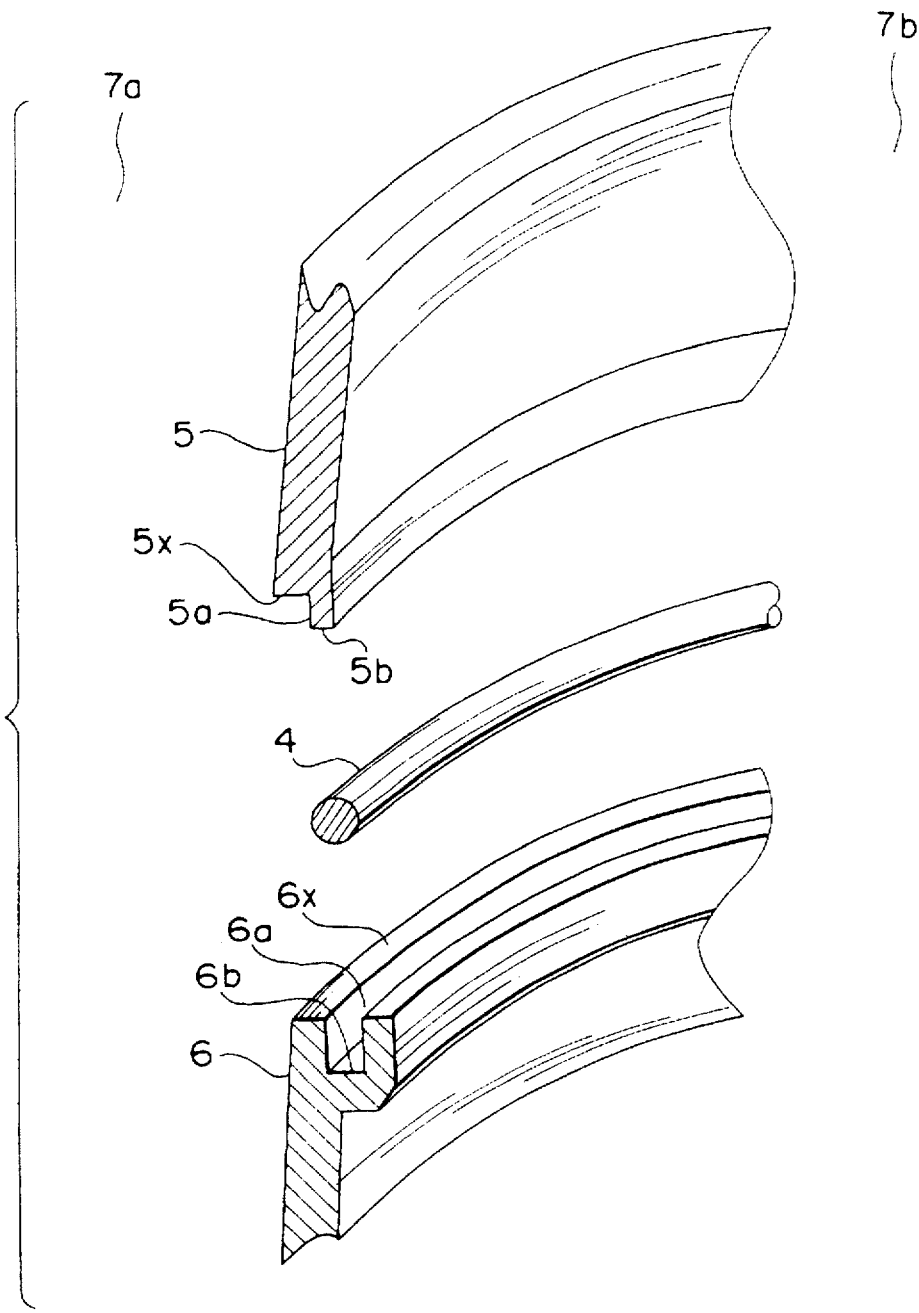
FIG. 7 is an exploded perspective view partly in section of FIG. 5B.

The water-proof mechanism of the water-proof camera 10 is fundamentally constituted so that a packing or a packing member 4 is sandwiched between the connection surfaces of two members 5 and 6 as shown in the perspective view of FIG. 5B. In other words, in a normal non-water-proof camera, a projection 5s is formed inside of one member 5 while a notch 6s is formed on the other member 6 so that the two members 5 and 6 are butt-joined to each other. On the other hand, in this water-proof camera 10, as shown in exploded perspective views of FIG. 5B and FIG. 7, the projection 5a which continues along the connection surface 5x is formed on the inside 7b of the camera on the connection surface 5x of one member 5 while a groove 6a which continues is formed on the connection surface 6x of the other member 6, and the packing 4 is inserted into the groove 6a. Then, the projection 5a of the one member 5 is inserted into the groove 6a of the other member 6 so that the two members 5a and 6 are connected to each other. At this time, as shown in the enlarged sectional view of FIG. 6, the connection surfaces 5x and 6x of the two members 5 and 6 on the outside 7a of the camera are butted to each other. Furthermore, on the inside 7b of the camera, both members 5 and 6 compresses the packing 4 between the end 5b of the projection 5a of the one member 5 and the bottom surface 6b of the groove 6a of the other member 6. Consequently, the packing 4 is filled in the groove 6a, and a space between the two members 5 and 6 are hermetically sealed. In other words, an external part 7a and an internal part 7b are hermetically sealed. The inside of the packing 4 which is used in the water-proof camera 10 is sponge-like, and the whole external circumference is constituted by a string-like packing which is covered with a water-proof skin layer all around. The groove 6a and the projection 5a are constituted so that a compression rate of the packing 4 is about 50%. A repulsion force of the compression by the packing 4 is small with only about one fourth to one third of the conventional central core silicone packing.

Specifically, on the connection surface of the main body 50 of the camera, respective covers 20, 30, 40, 60 and 70 and the container chamber lid 80, namely along the rim surface, or along the external rim, the aforementioned projection 5a namely the rib, or the groove 6a is continuously formed inside thereof so that the rib or the groove goes around itself. Incidentally, on each cover 20, 30, 40, 60 and 70, a hole is processed at an appropriate position to which an operation button, a display window or the like is hermetically provided thereby constituting as a single body a water-proof structure for preventing the infiltration of liquid.

Next, a structure of the connection part between respective covers 20, 30, 40, 60, 70, and the lid 80 of the container chamber; and a method for the connection thereof are explained.

In the beginning, with reference to FIGS. 8 through 10, the order of connecting cover elements which constitute the cover or the like is explained. At a first step, the front cover 30 is connected to the side cover 40 to constitute a preparatory connection cover group 12. Next, the top cover 20 is connected to the preparatory connection cover group 12 to constitute a first cover group 14. Next, the main body 50 of the camera is connected to the first cover group 14 to constitute a half completed body 16. Next, the rear cover 60 and the bottom cover 70 are connected to constitute a second cover group 18. Next, the second cover group 18 is connected to the half completed body 16. Lastly, the lid 80 of the container chamber is attached on the main body 50 of the camera so that the water-proof camera 10 is completed. Incidentally, the lid 80 of the container chamber 80 may be attached to the body of the camera in advance.

Next, in accordance with the aforementioned connection order, the structure of each member and the connection method are explained.

Figure 15:
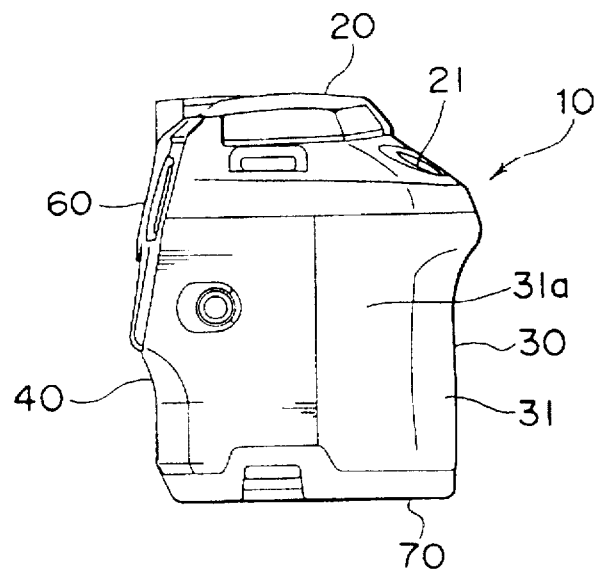
FIG. 15 is a left side view of the water-proof camera of FIG. 11.
Figure 16:
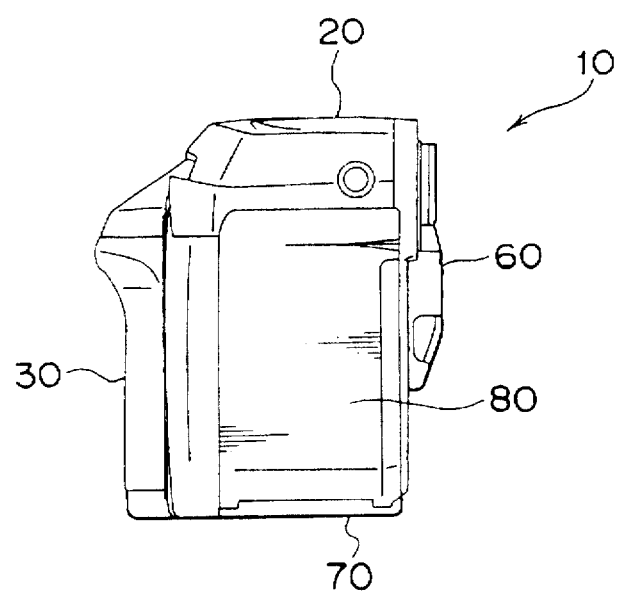
FIG. 16 is a right side view of the water-proof camera of FIG. 11.
Figure 17:
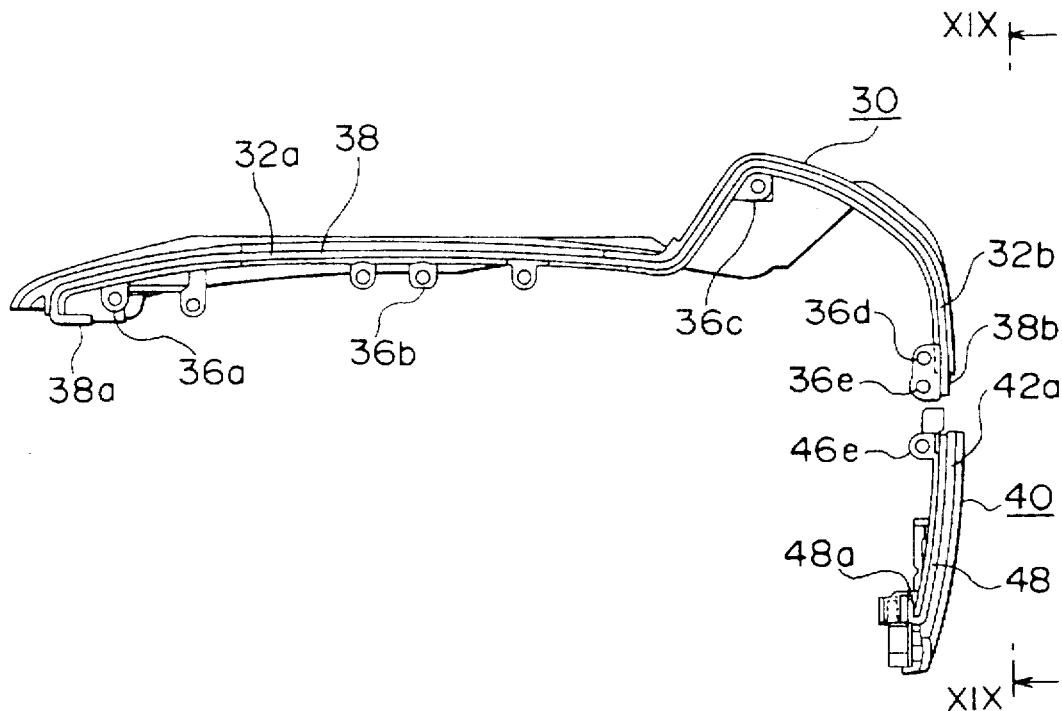
FIG. 17 is a top view of the front cover and the side cover.
Figure 18:
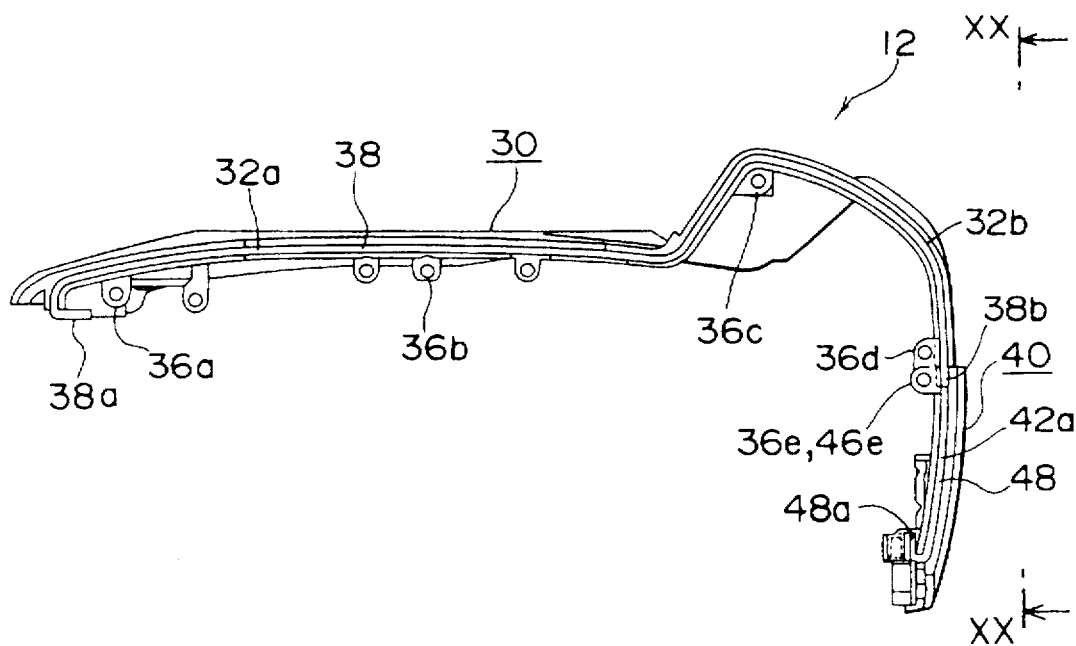
FIG. 18 is top view showing that both covers of FIG. 17 are connected to each other.
Figure 19:
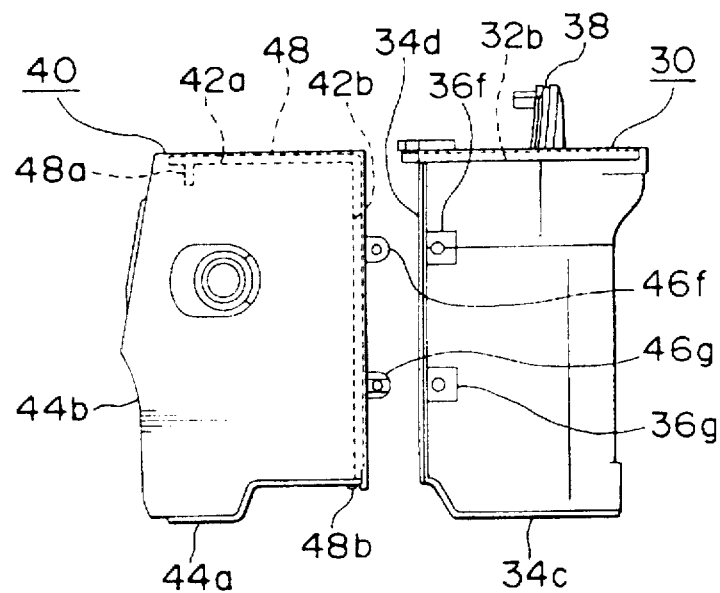
FIG. 19 is a left side view taken approximately on a line corresponding with XIX—XIX of FIG. 17.
Figure 20:
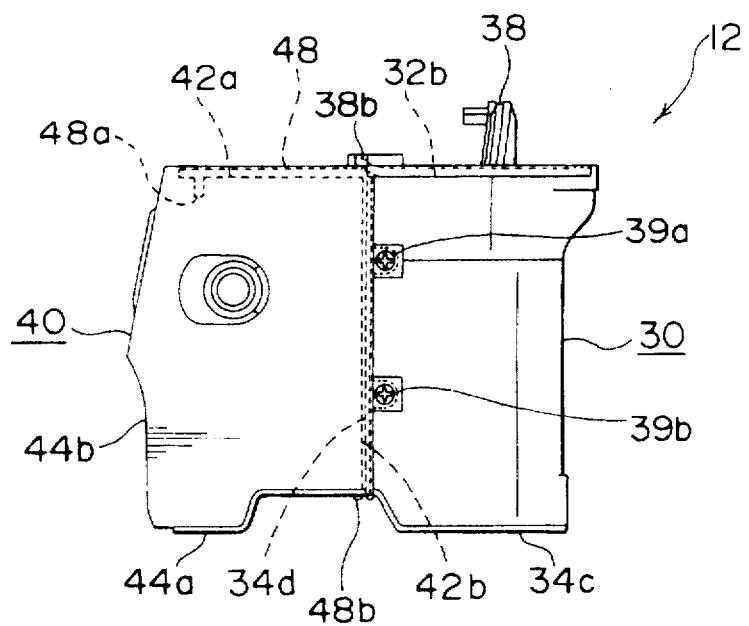
FIG. 20 is a left side view taken approximately on a line corresponding with XX—XX of FIG. 18.
Figure 21:
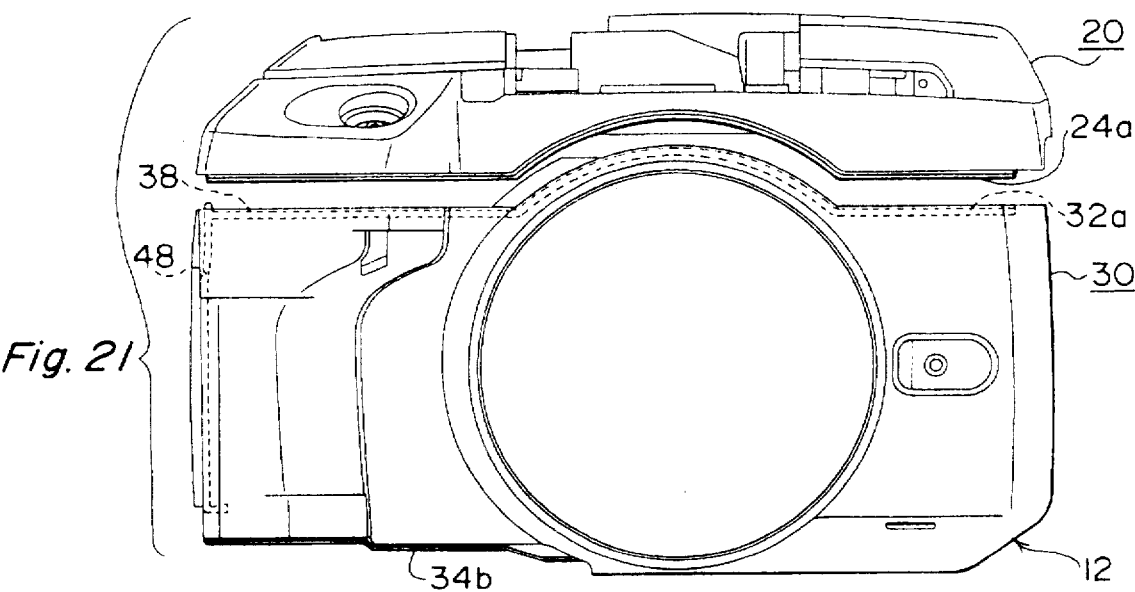
FIG. 21 is a front view of a top cover and a preparatory connection cover group of the camera.
Figure 22:
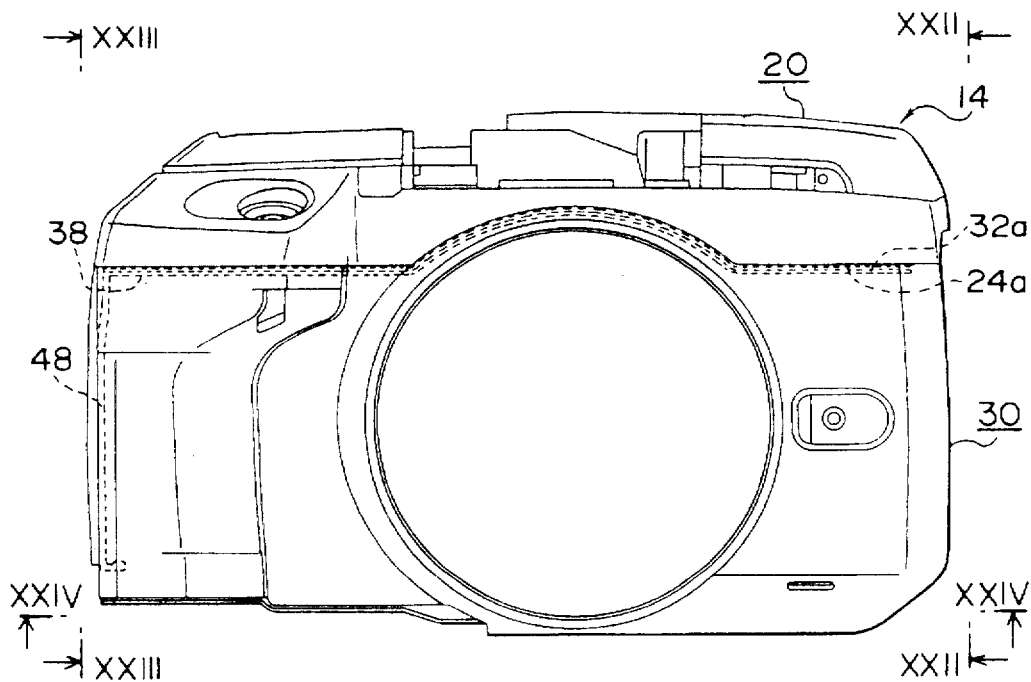
FIG. 22 is a front view of a first cover group which is constituted by connecting the top cover and the preparatory connection cover group shown in FIG. 21.
Figure 23:
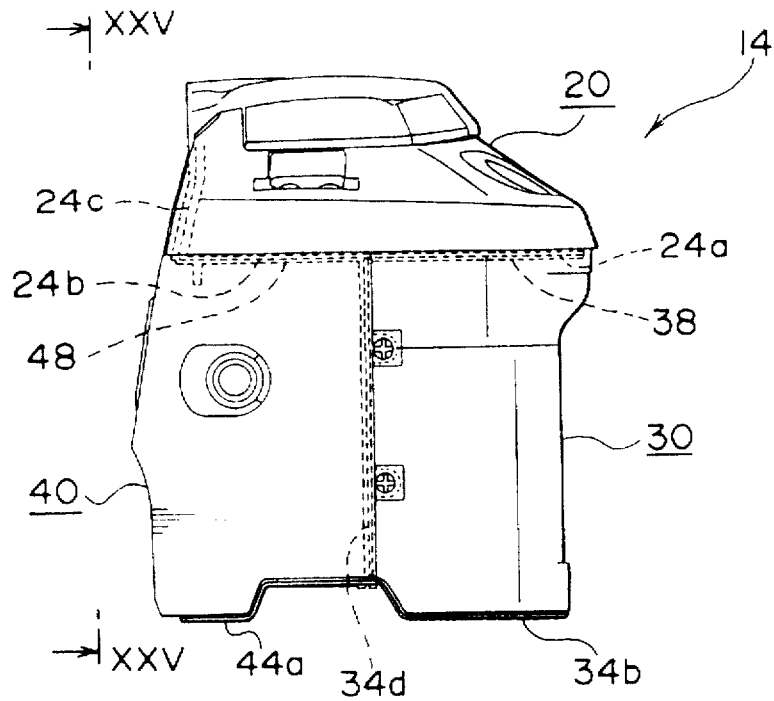
FIG. 23 is a left side view taken approximately on a line corresponding with XXIII—XXIII of FIG. 22.

As shown in FIGS. 8 and 9, and in the top view of FIG. 17, and in the left side view of FIG. 19, grooves 32a and 32b are continuously formed on the rim surface on the front cover 30. On the rim surface on the right, bottom and left side, ribs 34a, 34b, 34c and 34d are continuously formed. Furthermore, grooves 42a and 42b are continuously formed on the rim surface on the top and front surfaces. On the front cover 30, screw parts 36a through 36e are formed inside along the top rim surface and screw parts 36f and 36g are formed along the left rim surface. On the side cover 40, screw parts 46e, 46f and 46g are provided in correspondence to the screw parts 36e, 36f and 36g of the front cover 30 along the left rim surface end. Into the grooves 32a and 32b on the front cover 30, the packing 38 is inserted, and into the grooves 42a and 42b on the top and front of the side cover 40, the packing 48 is inserted. As shown in the top view of FIG. 18 and in the right side view of FIG. 20, the left rib 34d of the front cover 30 is inserted into the groove 42b of the side cover 40. Then the screw parts 36e, 36f and 36g of the front cover 30 are overlapped with the screw parts 46e, 46f and 46g of the side cover 40 for fastening each other with screws. At this time, as shown in FIG. 20, the screws 39a and 39b for fastening are exposed at the outside of the left side of the front cover 30. However, as shown in FIG. 15, a grip rubber 31a is attached onto the grip part 31 so that the screws 39a and 39b are hidden from outside thereby. Both covers 30 and 40 connected by the fastening with the screws are not separated with a repulsion force generated by the compression of the packing 48, and the both covers 30 and 40 are integrated with each other to constitute the preparatory connection cover group 12. The connection surface of both covers 30 and 40 is sealed with the packing 48 of the side cover 40. One end part 48a of the packing 38 of the side cover 40 is locked in a hole which is made inside on the top rear side rim of the side cover 40 while the other end part 48b thereof is locked with a front lower inside part of the side cover 40. One end part 38a of the packing 38 mounted on the front cover 30 is locked with a right top inside part of the front cover 30 while the other end part 38b of the packing 38 mounted thereon is overlapped on the packing 48 located at the front top of the side cover 40. On the rim surface on the preparatory connection cover group 12, the grooves 32a, 32b and 42a in which the packings 38 and 48 are inserted continues while on the right, bottom and left rim surfaces, the ribs 34a, 34b, 34c, 44a and 44b continues. In other words, on the rim surface, either the rib or the groove goes around the body.

Figure 24:
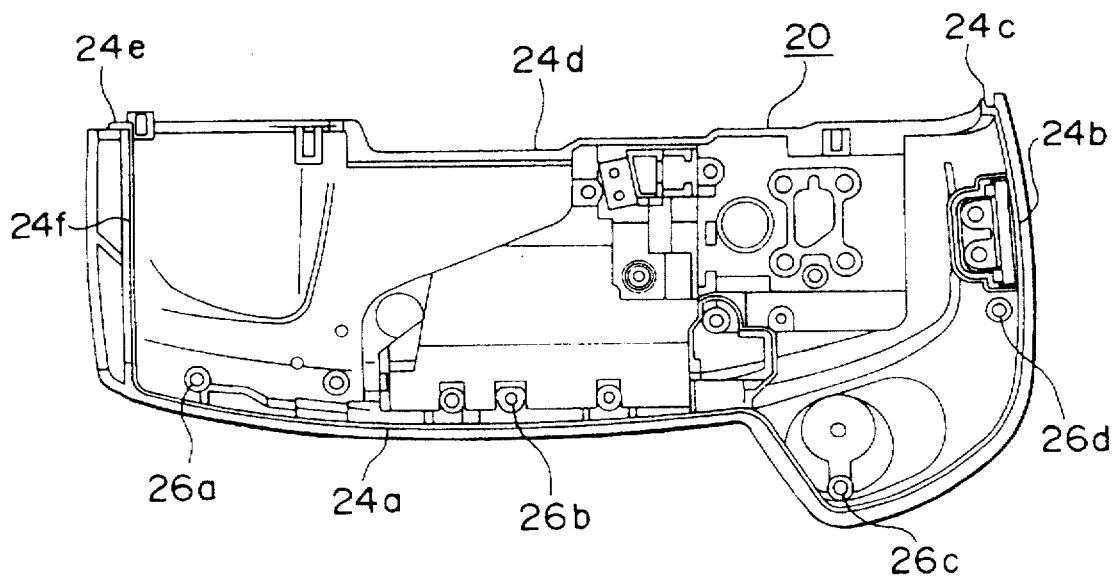
FIG. 24 is a bottom view taken approximately on a line corresponding with XXIV—XXIV of FIG. 22.
Figure 25:
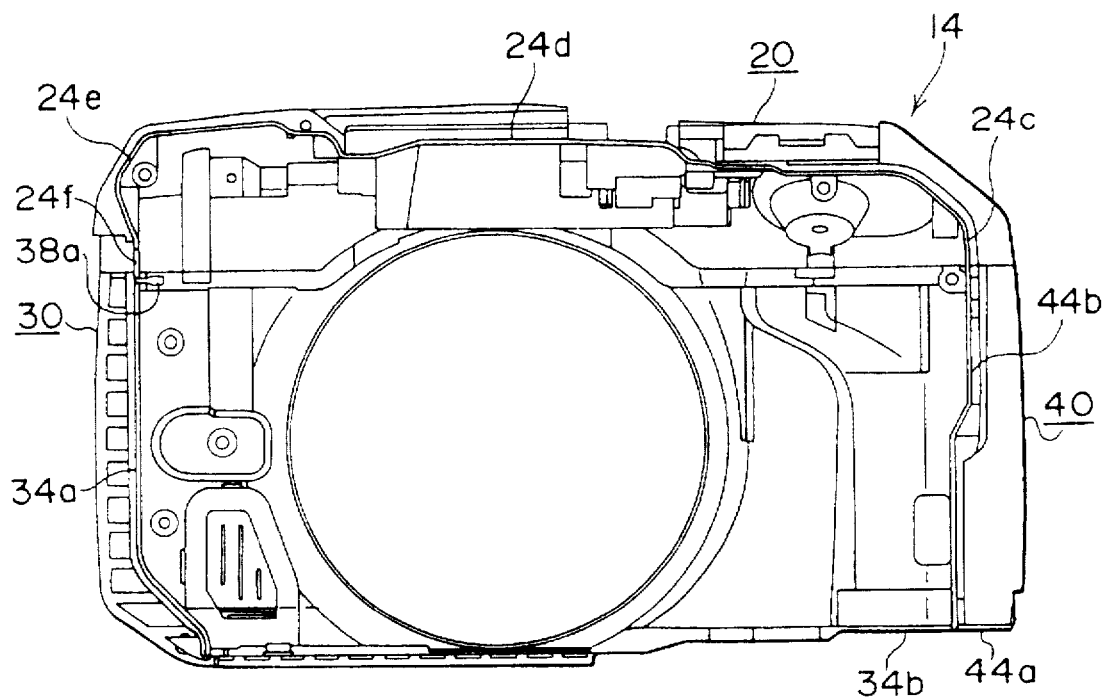
FIG. 25 is a rear side view taken approximately on a line corresponding with XXV—XXV of FIG. 23.
Figure 26:
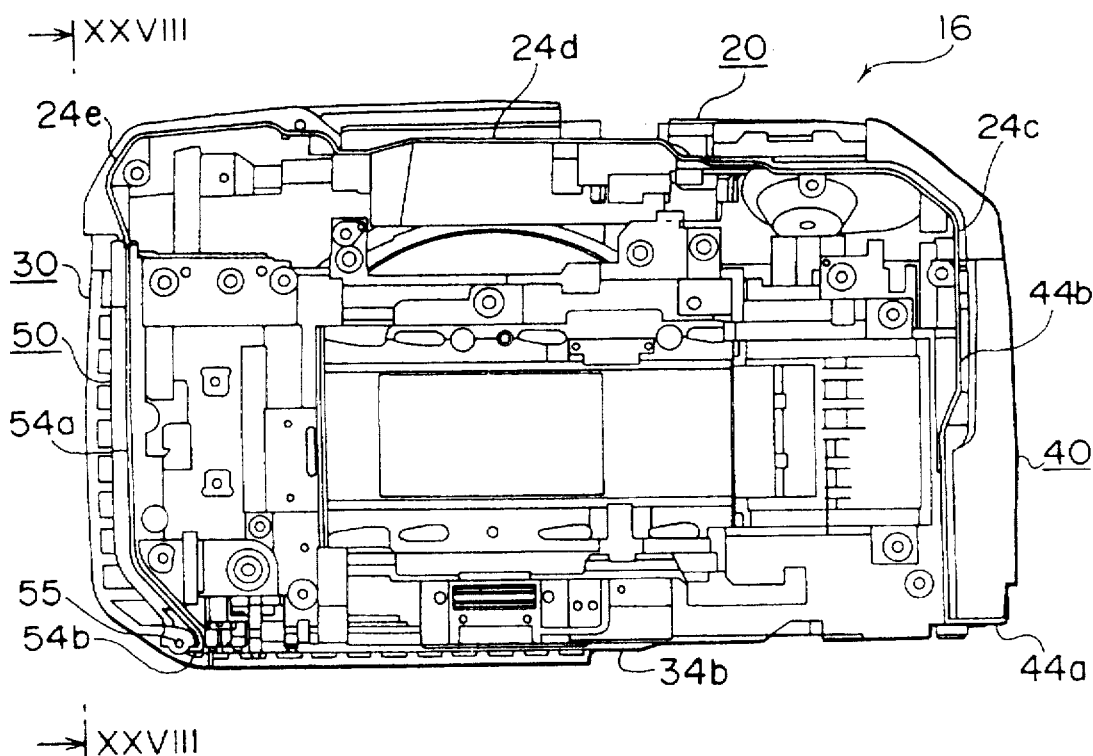
FIG. 26 is a rear side view of a half completed body showing that the main body of the camera is connected to the first cover group of FIGS. 22 through 24.
Figure 27:
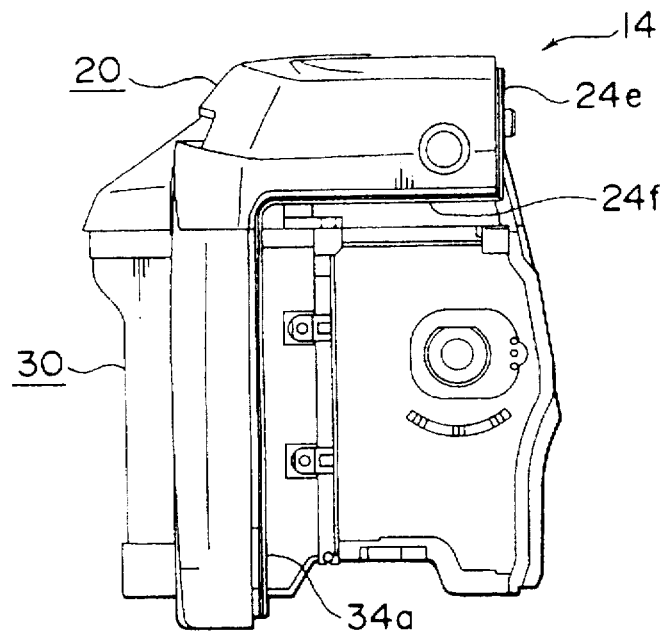
FIG. 27 is a right side view taken approximately on a line corresponding with XXII—XXII of FIG. 22.

On the preparatory connection cover group 12, the top cover 20 is connected. On the rim surface of the top cover 20, as shown in FIGS. 8 and 9, and in the front view of FIG. 21, and in the bottom view of FIG. 24, the ribs 24a through 24f are continuously formed so as to go around the body. Furthermore, as shown in FIG. 24, the screw parts 26a through 26d are provided inside of the bottom part of the top cover 20. Into the grooves 32a, 32b and 42a on the rim surface of the preparatory connection cover group 12, the ribs 24a and 24b on the bottom rim surface of the top cover 20 is inserted. The preparatory connection cover group 12, namely the screw parts 36a through 36d of the front cover 30 are overlapped with the screw parts 26a through 26d of the top cover 20 for fastening with screws. With the arrangement, as shown in the front view of FIG. 22, and in the left side view of FIG. 23, in the rear side view of FIG. 25 and in the right side view of FIG. 27, the preparatory connection cover group 12 and the top cover 20 are connected to be integrated thereby constituting the first cover group 14. With the construction, the packing 48 and the end part 38b of the packing 38 which are overlapped in the vicinity of the front top corner of the side cover 40 are compressed to be hermetically contacted with each other without gap therebetween, thereby sealing the T-shaped connection part. Furthermore, between the rib 24e behind the right side of the top cover 20 and the rib 34a behind the right side of the front cover 30, the end part 38a of the packing 38 is folded inside to be sandwiched therebetween with no gap. Furthermore, between the rib 24c behind the left side of the packing 38 and the rib 44b behind the side cover 40 the end part 48a of the packing 48 is folded inside to be sandwiched therebetween with no gap.

Next, the main body 50 of the camera is connected to the inside of the first cover group 14. The right rim surface of the first cover group 14 is constituted so that the rib 24f of the top cover 20 and the rib 34a of the front cover 30 continues. On the right side part of the main body 50 of the camera, as shown in FIGS. 8 and 9, and in the top view of FIG. 29 and in the right side view of FIG. 30, the grooves 52a and 52b are provided on the top surface and the front surface adjacent to the opening 51 of the film container chamber on the right side, and the ribs 54a and 54b are provided on the rear surface and the bottom surface. A part 53 in the vicinity of the opening 51 of the film container chamber between the opening 51, and the ribs 54a and 54b and the grooves 52a and 52b is constructed as a water-proof structure. The main body 50 of the camera is inserted into the inside of the first cover group 14 so that the ribs 24f and 34a on the rim surface of the first cover group is inserted into the grooves 52a and 52b on the top surface and the front surface of the main body 50 of the camera. Then, the screw parts located at appropriate positions of the first cover group 14, and the screw parts, located at the corresponding positions of the main body 50 of the camera are overlapped to each other. Then, the first cover group 14 and the main body 50 of the camera are fastened to each other with the screw parts being fixed to each other by screws. As a consequence, as shown in the rear side view of FIG. 26 and in the right side view of FIG. 28, the first cover group 14 and the main body 50 of the camera are integrally connected to constitute the half completed body 16.

Figure 31:
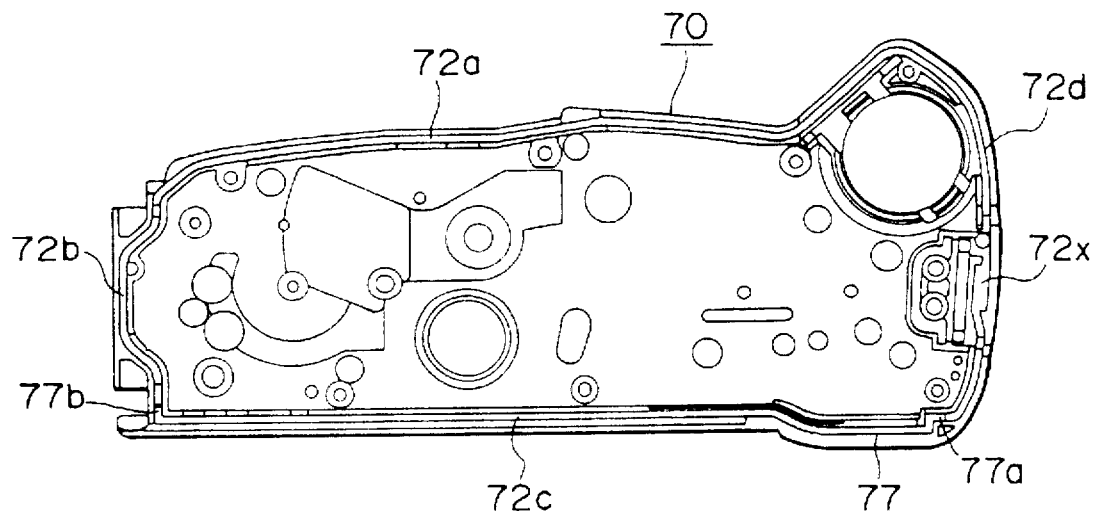
FIG. 31 is a top view of a bottom cover of the camera.

Next, the bottom cover 70 is connected to the rear cover 60 to constitute the second cover group 18. In the rear cover 60, as shown in FIGS. 8 and 10, the grooves 62a, 62b and 62c are formed continuously along the left, top and right rim parts. And the rib 64a is continuously formed along the lower rim part. Inside of the bottom cover 70, as shown in FIG. 8 and in the top view of FIG. 21, the grooves 72a through 72d are provided around the front, right, rear and left sides in this order. As shown in FIG. 31, the packing 77 is inserted into the groove 72c at the rear side of the bottom cover 70. Both ends 77a and 77b of the packing 77 extending beyond the groove 72c, are inserted in the right and left grooves 72b and 72d. The rib 64a of the rear cover 60 is inserted in the groove 72c of the bottom cover 70, and both parts 64a and 72c are fixed to each other by screws at an appropriate position. Thus, both covers 60 and 70 are integrally connected to constitute the second cover group 18, as shown in the top view of FIG. 32 and in the rear side view of FIG. 33.

Figure 32:
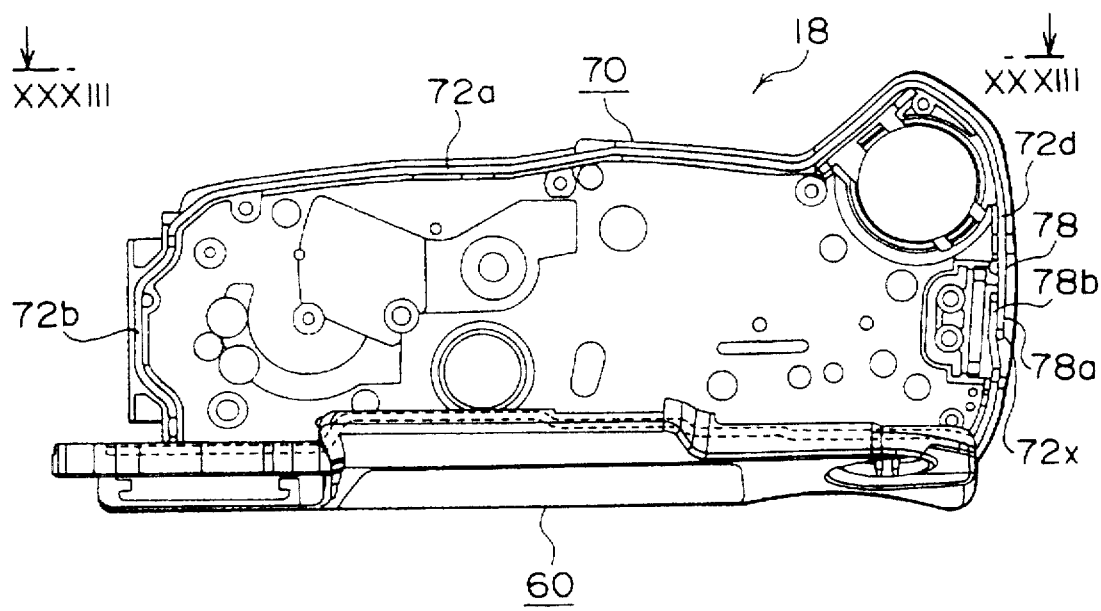
FIG. 32 is a top view of a second cover group which is constituted by connecting the bottom cover of FIG. 31 to the rear cover thereof.
Figure 33:
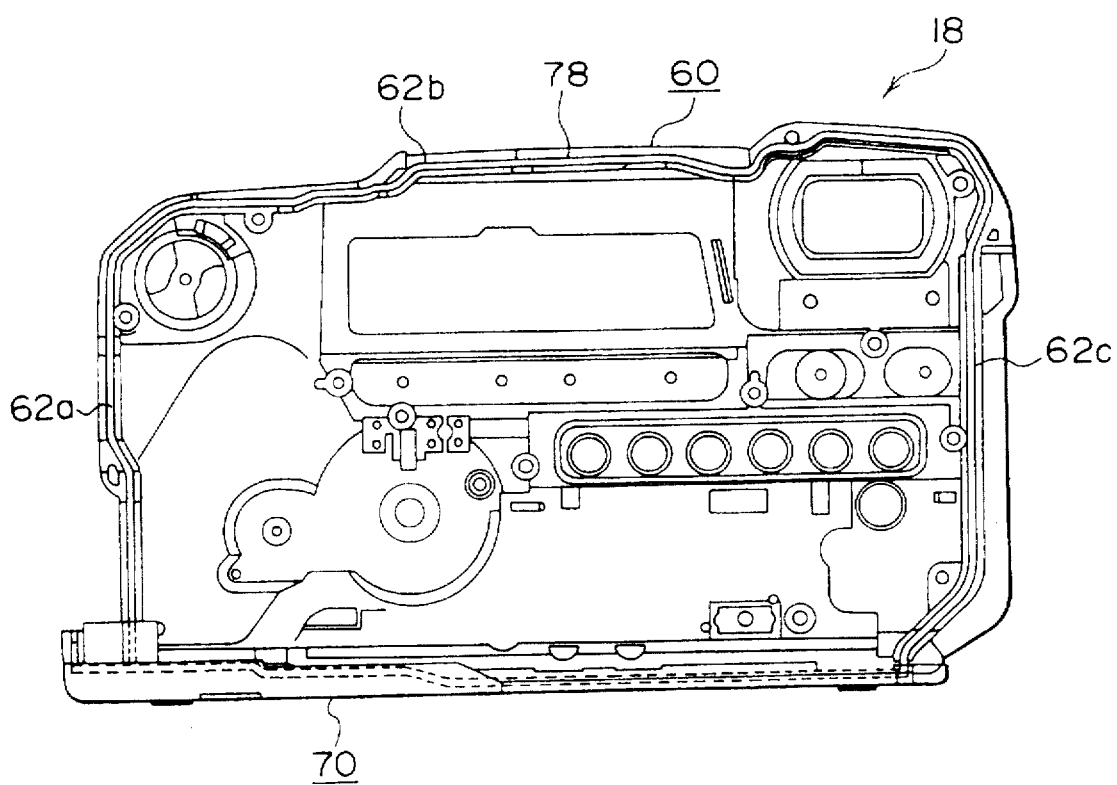
FIG. 33 is a rear side view taken approximately on a line corresponding with XXXIII—XXXIII of FIG. 32.

Next, the second cover group 18 is connected to the half completed body 16. Before the connection, as shown in FIGS. 32 and 33, the packing 78 is inserted into the grooves 62a, 62b and 62c of the rear cover 60 and the grooves 72b, 72a and 72d of the bottom cover 70 so as to extend around the inside of the whole circumference of the second cover group 18. At this time, the packing 78 is overlapped on both ends 77a and 77b, of the packing 77 inserted in the groove 72c, extending beyond the left and right grooves 72b and 72d of the bottom cover 70. The end parts 78a and 78b of the packing 78 are arranged so as to be adjacent to each other in a wide part 72x of the left groove 72d of the bottom cover 70. Then the ribs 44b, 24c, 24d, 24e, 54a, 54b, 34b, 34c and 44a of the half completed body 16 are inserted into the grooves 62a, 62b, 62c, 72b, 72a, and 72d, and they are fastened mutually at appropriate positions by screws, thereby connecting the second cover group 18 and the half completed body 16 to each other. The parts where the packing 78 is overlapped with the both ends 77a and 77b of the packing 77 are compressed and brought to a mutually close contact with each other to provide a sealing function when the second cover group 18 is connected to the half completed body 16. In the same manner, the adjacent parts of the both ends 78a and 78b of the packing 78 are closely located together, thus realizing the sealing function.

Figure 28:
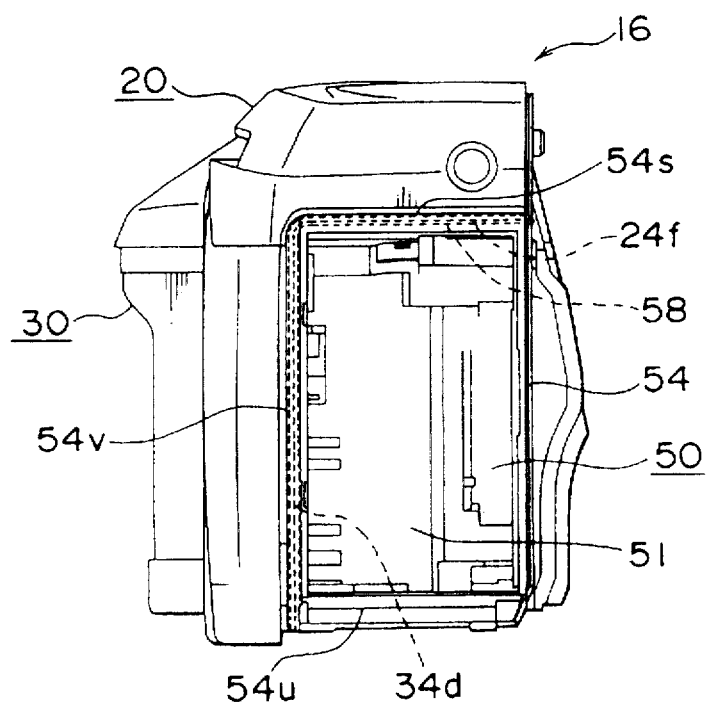
FIG. 28 is a right side view taken approximately on a line corresponding with XXVIII—XXVIII of FIG. 26.
Figure 29:
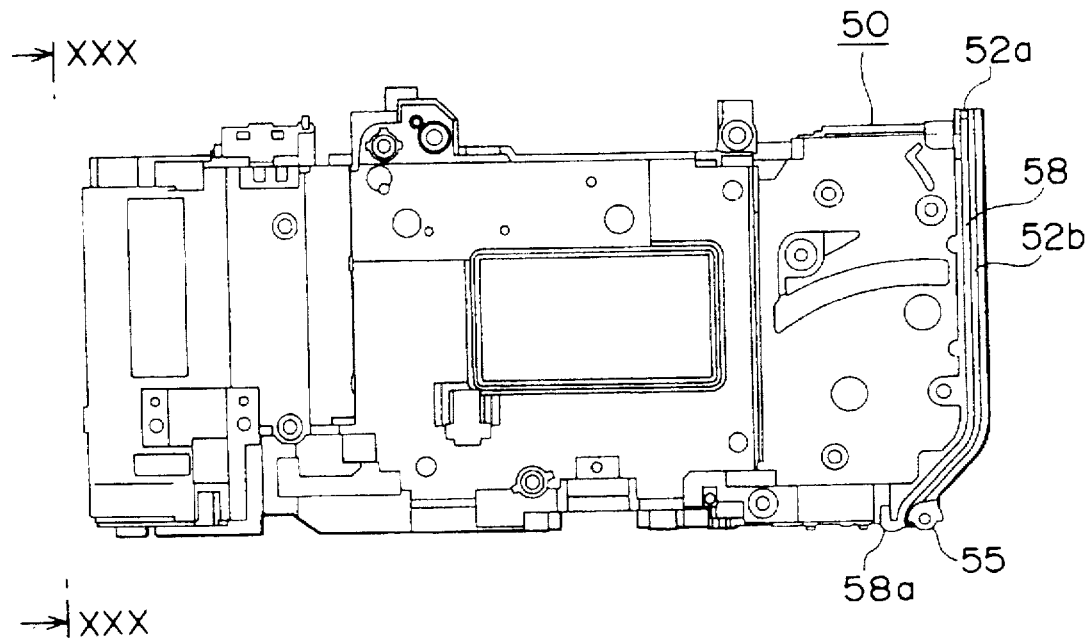
FIG. 29 is a front view of the main body of the camera.
Figure 30:
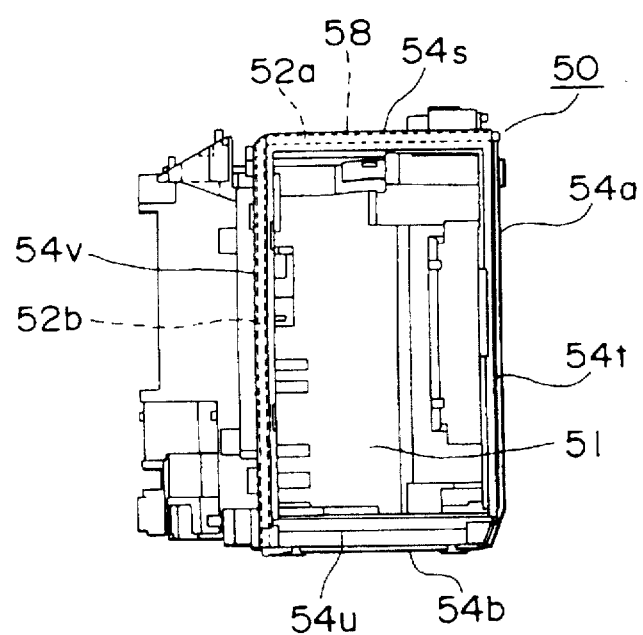
FIG. 30 is a right side view taken approximately on a line corresponding with XXX—XXX of FIG. 29.

Lastly, the lid 80 of the container chamber is rotatably attached to the lid fixing part 55 (see FIGS. 26 and 29) at the bottom part of the opening 51 of the container chamber which is on the right side of the half completed body 16, or of the main body 50 of the camera. Incidentally, the lid 80 of the container chamber may be attached on the camera body 50 in advance. On the half completed body 16, namely the main body 50, of the camera, as shown in FIGS. 10 and 28, the ribs 54s through 54v are continuously formed along the opening 51 of the container chamber on the right side thereof. The ribs 54s through 54v go around the body. On the other hand, on the lid 80 of the container chamber, as shown in FIG. 8, the grooves 82s through 82v are continuously formed along the rim corresponding thereto. Then the packing is inserted into the grooves 82s to 82v. Then, when the lid 80 of the container chamber is closed, the opening 51 of the container chamber of the main body 50 of the camera is hermetically closed.

The camera with the aforementioned structure has respective covers 20, 30, 40, 60 and 70, the lid 80 of the container chamber, and the part in the vicinity of the opening of the main body 50 of the camera which are all constructed as water-proof structure. Since the covers 20, 30, 40, 60 and 70, the lid 80 of the container chamber, and the part in the vicinity of the opening of the main body 50 of the camera are hermetically connected to each other, the water-proof function works. Respective covers 20, 30, 40, 60 and 70 are normally fixed to the main body 50 of the camera. At time of loading the film container therein, the lid 80 of the container chamber is opened and closed. The water-proof camera 10 is provided with a film loading device at the main body of the camera. When the lid 80 of the container chamber is opened, the film container is loaded therein, and the lid 80 is closed, the film is automatically pulled out of the inside of the film container. At time of disassembling it, it is possible that the bottom surface and the rear surface of the main body 50 of the camera can be accessed by removing the second cover group 18, namely the bottom cover 70 and the rear cover 60.

As described above, screws are not exposed outside this water-proof camera 10 with a mechanism that respective covers 20, 30, 40, 60 and 70, and the lid 80 being connected to the main body 50 of the camera. That is, in the water-proof camera 10 having the aforementioned structure, the top cover 20 and the front cover 30 are mutually connected inside with the screws. Furthermore, the main body 50 of the camera is fastened from inside to the top cover 20 and the front cover 30 with the screws. Consequently, the water-proof camera can be constituted so that the screws are not exposed outside the front surface of the camera.

Figure 11:
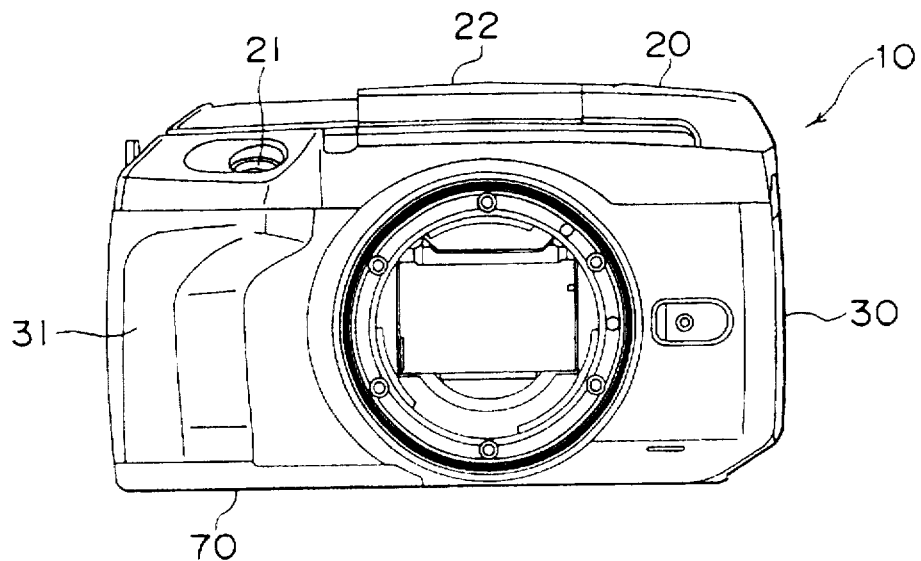
FIG. 11 is a front view of the water-proof camera according to the embodiment of the present invention.
Figure 13:
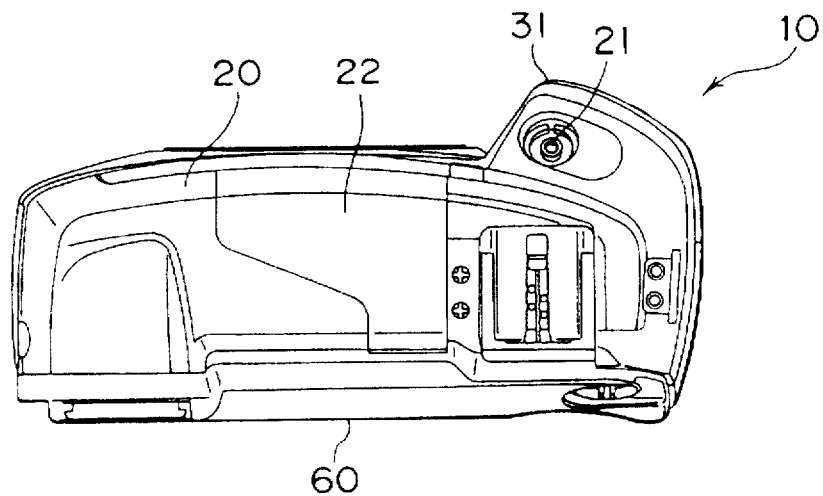
FIG. 13 is a top view of the water-proof camera of FIG. 11.

Furthermore, it is possible to constitute the water-proof camera in a relatively free shape. For example, as shown in FIGS. 11 and 13, it is also possible to form the left front part of the front cover 30 as a projecting part to form the grip part 31. This arrangement also realizes a good gripping characteristic. Furthermore, it is also possible to form a water-proof camera 10 in a complicated shape in which some part thereof is formed so angled that a release button can be easily operated, or in which a pop-up electric flash 22 is provided on the top part thereof, with the water-proof function being realized in either case.

Figure 12:
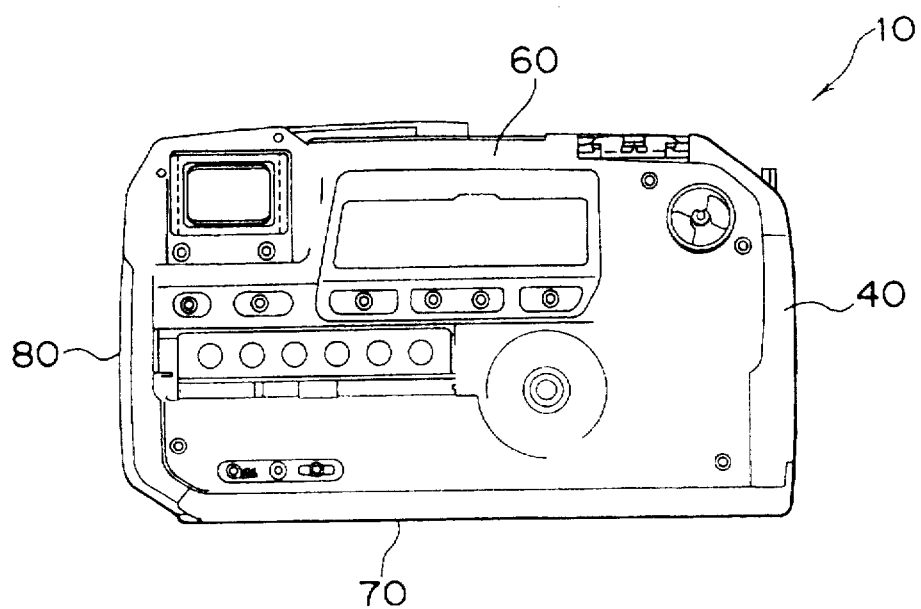
FIG. 12 is a rear side view of the water-proof camera of FIG. 11.
Figure 14:
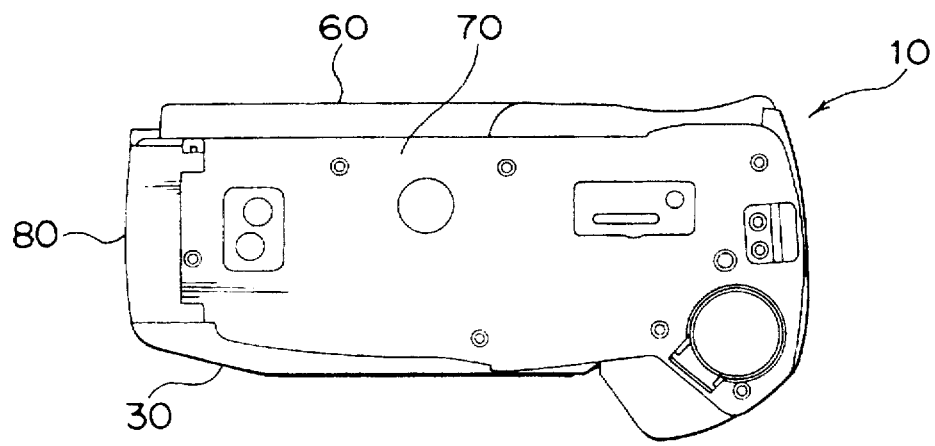
FIG. 14 is a bottom view of the water-proof camera of FIG. 11.

Since the rear and bottom covers 60 and 70 are connected to the rear surface and the bottom surface of the main body 50 with the screws from outside, the screws are exposed outside the rear surface and the bottom surface of the water-proof camera 10 as shown in FIGS. 12 and 14. However, even if the screws are exposed at the locations, no problem is posed in terms of the design. Rather, the arrangement is desirable because at time of disassembling it by removing the rear cover 60 and the bottom cover 70, the inside of the camera is easy of access.

Next, a second embodiment in which the rear cover 60 and the bottom cover 70 are connected to the half completed body 16 by a different way is explained with reference to FIGS. 34 through 37.

Figure 34:
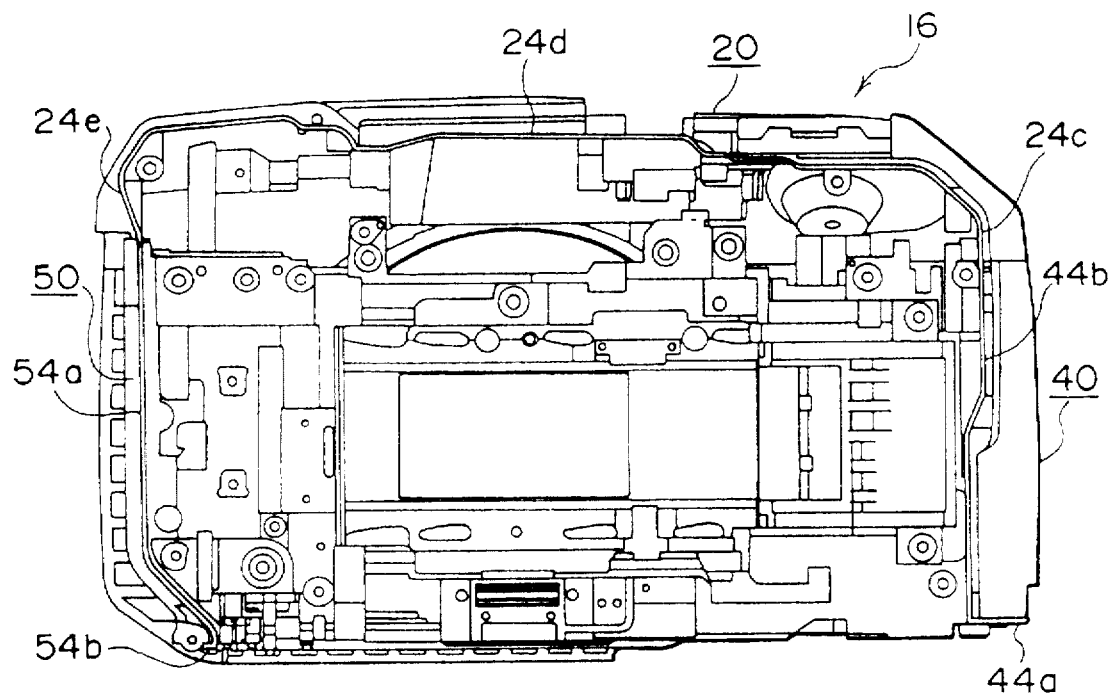
FIG. 34 is a rear side view of a half completed body of a water-proof camera according to a second embodiment of the present invention.
Figure 35:
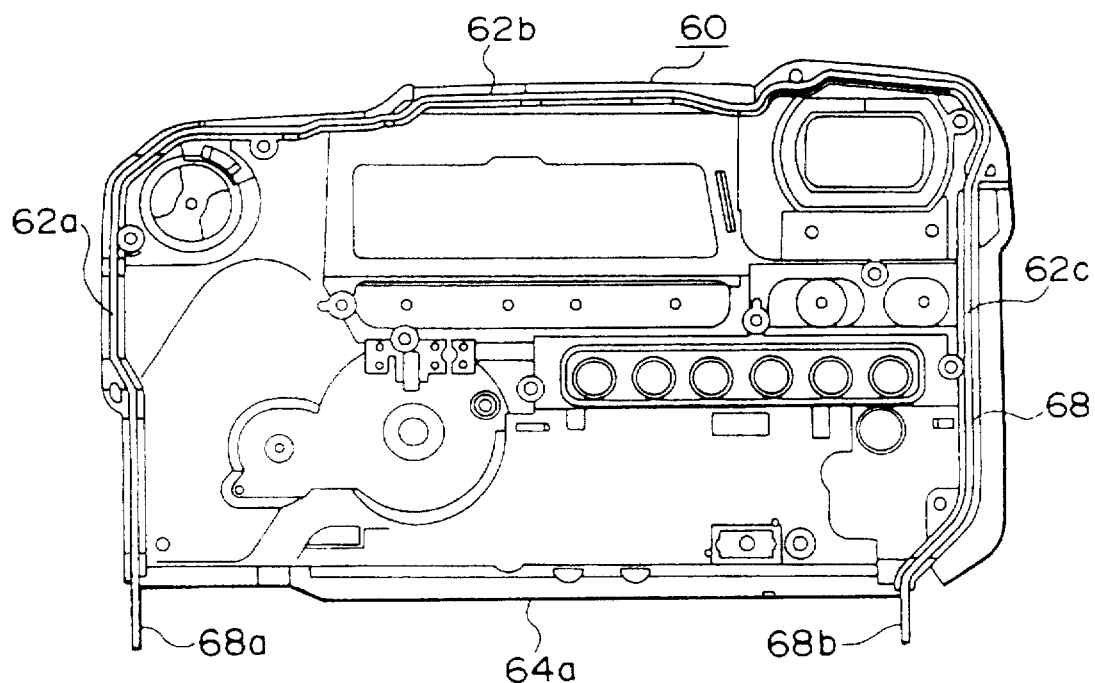
FIG. 35 is a front view of a rear cover of the water-proof camera according to the second embodiment.
Figure 36:
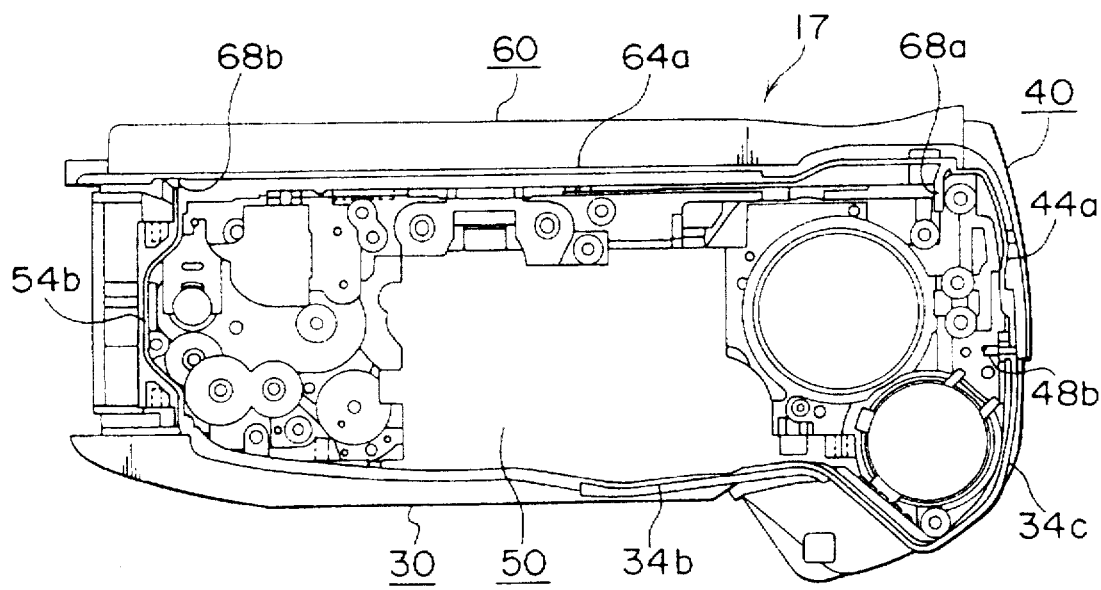
FIG. 36 is a bottom view of a second half completed view which is constituted by connecting the rear cover of FIG. 35 to the half completed body of FIG. 34.
Figure 37:
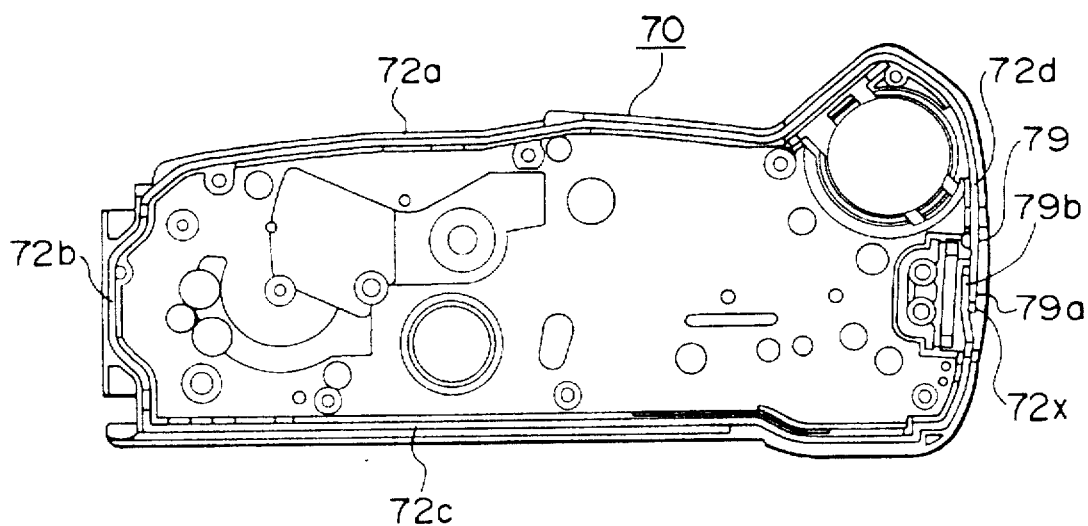
FIG. 37 is a top view of the bottom cover according to the second embodiment.

In the second embodiment, after the half completed body 16 is prepared in the same manner as the first embodiment as shown in the rear side view of FIG. 34, the rear cover 60 is connected to the half completed body 16 at the outset. Then the bottom cover 70 is connected thereto. Then the lid 80 of the film container chamber is attached thereto in the same manner as the first embodiment.

The grooves 62a, 62b and 62e and the rib 62a are formed on the rear cover 60 in the same manner as the first embodiment. As shown in the rear side view of FIG. 35, the packing 68 is inserted into the grooves 62a, 62b and 62c of the rear cover 60 in such a manner that both end parts 68a and 68b of the packing 68 extend beyond the grooves 62a and 62b. The ribs 44b, 24c, 24d, 24e and 54a of the half completed body 16 are inserted into the grooves 62a, 62b and 62c to connect the half completed body 16 and the cover 60 to each other at their relatively appropriate position with screws, thereby forming a second half completed body 17. Then, on the second half completed body 17, as shown in the bottom view of FIG. 36, the rib 64a of the rear cover 60, the rib 44a of the side cover 40, the ribs 34c and 34b of the front cover 30, and the rib 54b of the main body 50 of the camera continue to go around the body of the camera. Furthermore, the end parts 68a and 68b of the packing 68 which extend from the rear cover 60 are folded inside the camera and are sandwiched, without gap, between the groove 62a of the rear cover 60, the rib 44a of the side cover 40, and the rib 54b of the main body of the camera 50.

In the same manner as the first embodiment, the grooves 72a through 72d are formed on the bottom cover 70. As shown in the top view of FIG. 37, the packing 79 is inserted into the grooves 72a through 72d of this bottom cover 70, and both end parts 79a and 79d of the packing 79 are arranged so as to be adjacent to each other in a wide part 72x of the left groove 72d. Then the aforementioned ribs 64a, 44a, 34c, 34b and 54b which go around the body on the bottom side of the second half completed body 17 are inserted into the grooves 72a through 72d of the bottom cover 70. Then the bottom cover 70 is connected to the second half completed body 17 by screw fastening at a relative, appropriate position.

According to the aforementioned structure, since the packings 68 and 79 are mounted on the rear cover 60 and on the bottom cover 70, respectively, only the bottom cover 70 can be removed therefrom without removing the rear cover 60 at time of disassembling.

Although the present invention has been fully described in connection with the preferred embodiments thereof with reference to the accompanying drawings, it is to be noted that various changes and modifications are also apparent to those skilled in the art.

For example, the divisional positions of the front cover 30 and the side cover 40 may be altered so that the grip part 31 is included in the side cover 40 and not included in the front cover 30. With respect to other covers, the divisional positions may be altered. Alternatively, the side cover 40 may be connected to the front cover 30 after the top cover 20 and the front cover 30 are connected to each other. In the type of the camera in which a box for accommodating a film container is taken out from the main body of the camera, the lid 80 of the film container chamber can be constructed as a side of the box for accommodating the film container. Alternatively, it is possible to apply the present invention to other types of cameras other than the single-lens reflex cameras, for example, to a lens shutter camera.

What is claimed is:

1. A water-proof camera comprising:

a camera body which has an opening part of a chamber for receiving a film container being loaded therein;

a first cover member which covers a first part of the camera body and which is hermetically connected to the opening part by a sealing mechanism;

a second cover member which covers a second part of the camera body, wherein the first and second covers are hermetically connected to each other by the sealing mechanism; and a chamber lid, able to be opened and closed relative to the opening part, which is hermetically connected to the opening part by the sealing mechanism when the chamber lid is closed relative to the opening part.

2. The water-proof camera as claimed in claim 1, in which the sealing mechanism comprises a rim, a groove which engages the rim, and a packing member which is put between the rim and the groove.

3. The water-proof camera as claimed in claim 2, in which the packing member is in a form of a string.

4. The water-proof camera as claimed in claim 3, in which the sealing mechanism forms on a periphery of the first cover member and on a periphery of the second cover member, wherein the packing member engages and is supported by the groove.

5. A water-proof apparatus comprising:

a body;

a first cover which covers a first part of the body;

a second cover which covers a second part of the body and which is hermetically connected to the first cover;

a third cover which covers a third part of the body and which is hermetically connected to the first and second covers; and at least one packing member in a form of a string which is provided among the first, second and third covers to hermetically connect one another, wherein the string has a pair of ends.

6. The water-proof apparatus as claimed in claim 5, in which at least a pair of ends of the packing member are arranged in a vicinity of a part where the first, second and third covers oppose one another.

7. The water-proof apparatus as claimed in claim 6, in which the ends of the packing member are overlapped with each other.

8. A method for assembling a water-proof apparatus, comprising the steps of:

connecting a first cover member with a first edge and a second edge to form a periphery of the first cover member and a second cover member with a first edge and a second edge to form a periphery of the second cover member to each other, with a first part of a string-like packing including a pair of ends thereof being pinched between the first edge of the first cover member and the first edge of the second cover member;

providing a second part of the string-like packing along the second edge of the first cover member and the second edge of the second cover member;

providing the second part of the string-like packing between the second edge of the first cover member and a first edge of a third cover member with the first edge and a second edge to form a periphery of the third cover member, and between the second edge of the second cover member and the second edge of the third cover member; and connecting the first, second and third cover members to each other, with the second part of the string-like packing being pinched between the second edge of the first cover member and the first edge of the third cover member and between the second edge of the second cover member and the second edge of the third cover member, wherein the first, second and third covers are hermetically connected to each other.

9. The method for assembling a water-proof apparatus as claimed in claim 8, which further comprises the step of arranging at least the pair of ends of the string-like packing in a vicinity of a part where the first, second and third cover members oppose one another.

10. The method for assembling a water-proof apparatus as claimed in claim 9, which further comprises the step of overlapping the ends of the string-like packing with each other.

* * * * *